(12) United States Patent
Nishikawa

(10) Patent No.: US 7,433,528 B2
(45) Date of Patent: Oct. 7, 2008

(54) IMAGE PROCESSING APPARATUS

(75) Inventor: Shigeru Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 446 days.

(21) Appl. No.: 11/172,792

(22) Filed: Jul. 5, 2005

(65) Prior Publication Data
US 2006/0008163 A1    Jan. 12, 2006

(30) Foreign Application Priority Data

Jul. 6, 2004   (JP)   ............... 2004-199410
Jun. 7, 2005   (JP)   ............... 2005-167354
Jun. 20, 2005  (JP)   ............... 2005-179649

(51) Int. Cl.
*G06K 9/36*   (2006.01)
(52) U.S. Cl. ............... 382/239; 382/250; 375/240
(58) Field of Classification Search ............... 382/232; 375/240
See application file for complete search history.

(56) References Cited

U.S. PATENT DOCUMENTS 5,841,381 A    11/1998 Nakayama ............... 341/67

FOREIGN PATENT DOCUMENTS

JP    2000-102005    4/2000

OTHER PUBLICATIONS

Ramachandran, S. et al., "A Dynamically Reconfigurable Video Compression Scheme Using FPGAs with Coarse-grain Parallelism," 2002, VLSI Design, vol. 15, pp. 521-528.*

* cited by examiner

*Primary Examiner*—Jingge Wu
*Assistant Examiner*—John W Lee
(74) *Attorney, Agent, or Firm*—Fitzpatrick, Cella, Harper & Scinto

(57) ABSTRACT

In an image processing apparatus that performs image processing including a plurality of steps that do not need to be executed simultaneously, processing circuits used in steps that do not need to be executed simultaneously are reconfigured in time division using dynamically reconfigurable circuits, implementing a plurality of circuits without increasing the number of gates as well as achieving fast processing speed because processing is by hardware.

3 Claims, 17 Drawing Sheets ii. DURING VARIABLE LENGTH ENCODING
(SECOND PART OF MACRO BLOCK PROCESSING TIME PERIOD)
MPEG INTERFRAME PREDICTION ENCODING CIRCUIT

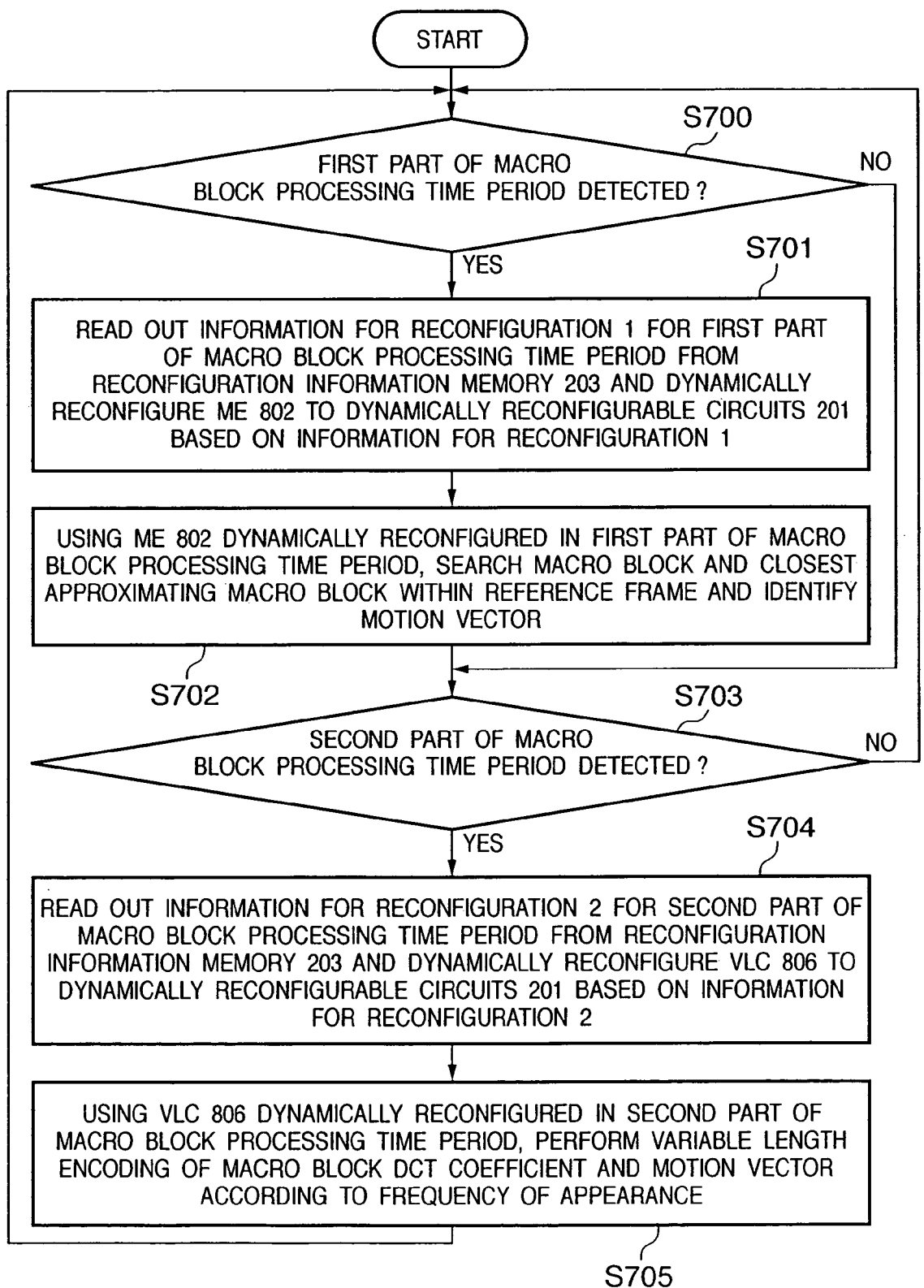

i. AT LOW THROUGHPUT (MACRO BLOCK PROCESSING CYCLE FIRST PART) MPEG INTERFRAME PREDICTION ENCODING CIRCUIT

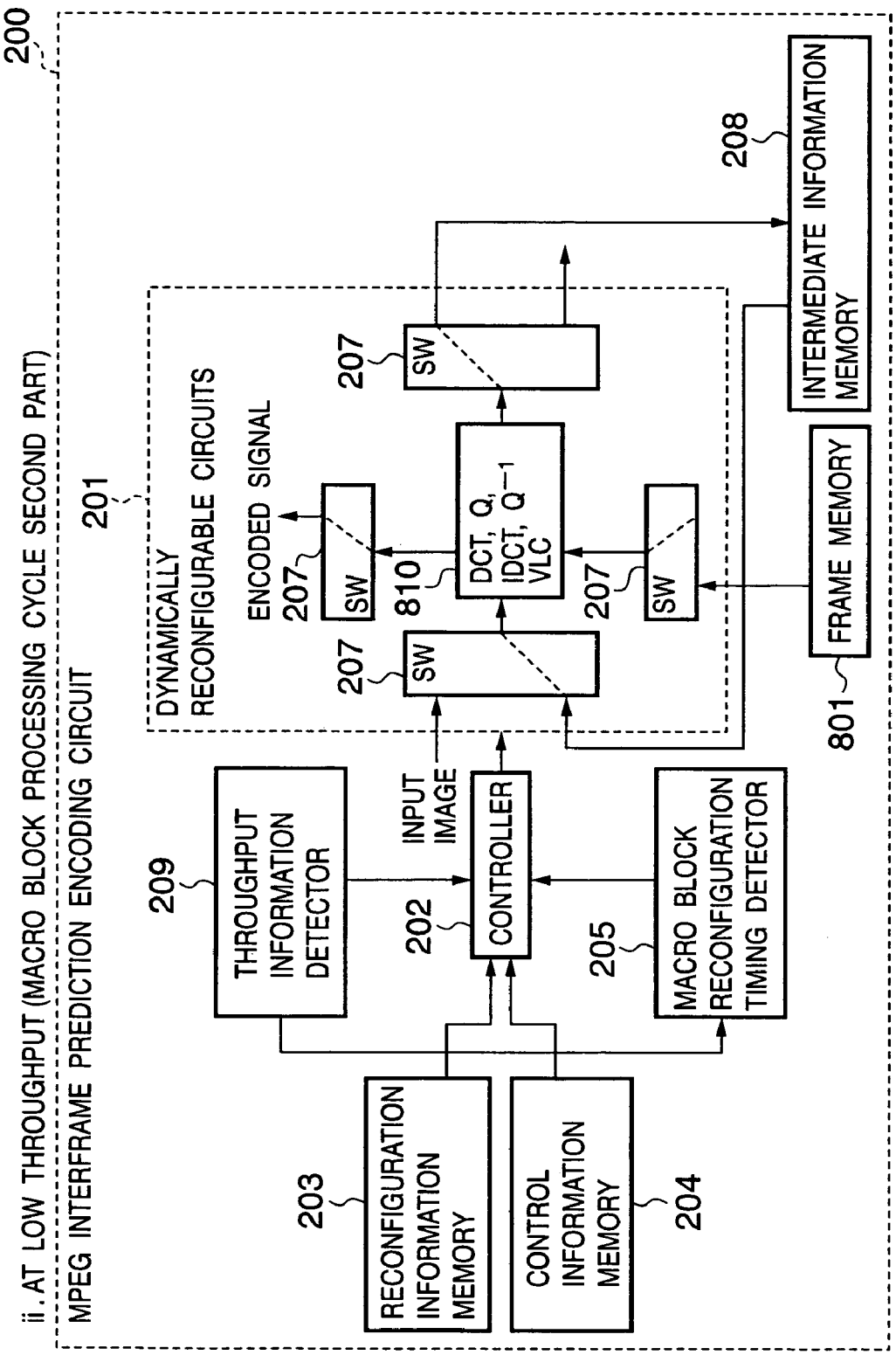

i. AT HIGH THROUGHPUT (MACRO BLOCK PROCESSING CYCLE FIRST TIME PERIOD)
MPEG INTERFRAME PREDICTION ENCODING CIRCUIT ii. AT HIGH THROUGHPUT (MACRO BLOCK PROCESSING CYCLE SECOND TIME PERIOD)
MPEG INTERFRAME PREDICTION ENCODING CIRCUIT iii. AT HIGH THROUGHPUT (MACRO BLOCK PROCESSING CYCLE THIRD TIME PERIOD) MPEG INTERFRAME PREDICTION ENCODING CIRCUIT

IMAGE PROCESSING APPARATUS

FIELD OF THE INVENTION

The present invention relates to an image processing apparatus, and more particularly, to an image processing apparatus that carries out image processing by executing a plurality of steps that do not particularly need to be executed simultaneously.

BACKGROUND OF THE INVENTION

The processing load presented by the compression and decompression of a still image or a moving image is considerable, and consequently, although it is necessary to use specialized hardware (i.e., a hardware codec) in order to carry out processing at high speed, it is disadvantageous to do so because it is costly and the because the mounting area increases. At the same time, however, in recent years, against the backdrop of the improving performance of ordinary microprocessors, opportunities for the use of a codec implemented as software to carry out compression/decompression using a combination of an ordinary microprocessor and software, inferior in terms of processing speed but superior in terms of cost, are also increasing.

Accordingly, considering the required performance and cost, usually a hardware codec is used when emphasizing performance (i.e., processing speed) and energy efficiency (or when it is not possible to process using a software codec), whereas a software codec is used when emphasizing cost and flexibility over performance, or when the performance of a hardware codec is not required.

Moving image compression/decompression loads are determined by the number of tones and the size (that is, the number of pixels per screen or frame) of the image to be processed, as well as by the response time (in the case of still images) and the frame rate (in the case of moving images). For example, in the case of a moving image, in which the image size is VGA (640 pixels×480 lines=307200 pixels) and the frame rate is 30 frames/second, having tones composed of 8 bits each of RGB color, a data processing speed of 640× 480×3×8×30=221.184 Mbps is required.

Using, for example, a typical memory with approximately 100 ns access time and a 16-bit data width bus, the bus band is only 16×10M=160 Mbps, and consequently, even if the bus could be used at 100 percent efficiency, the combination of an ordinary microprocessor and software cannot handle such a load. In actuality, it is difficult to use the bus with 100 percent efficiency, and moreover, time is needed for processing at the microprocessor and the like, thus further increasing the processing performance deficit. Therefore, in order to process a VGA-size full-color moving picture at 30 frames/second using a computer apparatus with a hardware configuration such as this, it is necessary to use a hardware codec.

It should be noted that the foregoing description applies not only to a codec that carries out both compression (encoding) and decompression (decoding) but also to an encoder and a decoder, which carries out one or the other of these two processes.

FIG. 8 is a diagram showing the configuration of an MPEG interframe prediction encoding circuit, as an example of a conventional hardware encoder.

Reference numeral 800 designates the MPEG interframe prediction encoding circuit, 801 designates a frame memory, 802 designates a motion detection circuit (hereinafter called ME (Motion Estimation)), 803 designates a motion compensation circuit (hereinafter called MC (Motion Compensation)), 804 designates a discrete cosine transform circuit (hereinafter called DCT (Discrete Cosine Transform)), 805 designates a quantization circuit (hereinafter called Q (Quantization)), 806 designates a variable length coding circuit (hereinafter called VLC (Variable Length Coding)), 807 designates an inverse quantization circuit (hereinafter called $Q^{-1}$ (Inverse Quantization)), and 808 designates an inverse discrete cosine transform circuit (hereinafter called IDCT (Inverse Discrete Cosine Transform)).

The frame memory 801 stores several frames of image data. The ME 802, using interframe image temporal correlation, detects the direction and extent of displacement within the frame of an image block to be encoded for an approximating reference image block (this is called a motion vector). The MC 803 carries out interframe prediction encoding using an image block offset by the motion vector from the position of the image block to be encoded within the reference frame as the reference image block. The DCT 804, using the fact that the spatial correlation of the images is high (that is, there is a strong possibility that adjacent areas within the images are of similar tone and intensity), carries out two-dimensional frequency conversion to the pixel values and outputs a DCT coefficient. Then the Q 805, when quantifying the DCT coefficient, reduces the data size of the high-frequency component by making a quantifying step for the DCT coefficient of the high-frequency component greater than the quantifying step for the low-frequency component. The output of the Q 805 is provided to the VLC 806 as well as to the local decoder 809 comprised of the $Q^{-1}$ 807 and the IDCT 808.

The VLC 806 carries out so-called entropy encoding, using a bias in the frequency of appearance to assign encoding of short encoding length to information sources having a high frequency of appearance in order to reduce the total encoding volume. By doing so, the encoded data size can be further reduced. The output of the VLC 806 is output as encoded results.

The $Q^{-1}$ 807 carries out inverse quantification and obtains the DCT coefficient. The IDCT 808 carries out inverse transformation and obtains pixel values that are encoded results (predicted error values).

In MPEG interframe prediction encoding, the local encoder 809 that is the equivalent of a decoding circuit composed of the $Q^{-1}$ 807 and the IDCT 808 is built into the encoding circuit. The necessity for a structure that corresponds to a decoding circuit in the encoding circuit arises because a motion-compensated interframe prediction encoding system encodes and transmits only the DCT coefficient and the motion position vector information based on a predicted error for the image of the next frame, reducing encoding volume. In other words, in such a system, the original image input using the encoding circuit is not conveyed to the decoding circuit, and the decoded image of the next frame has to be generated by adding the predicted error transmitted for the decoded image of the previous frame (that is, the predicted image for use in decoding) at the decoding circuit. Then, due to quantification error, the decoded image is not the same as the original image. Accordingly, in the encoding circuit as well, if the difference between the encoded data decoded image of the previous frame that has decoded encoded data (that is, the predicted image for use in encoding) and the input image of the next frame such as the decoding circuit carries out is not transmitted as the predicted error instead of the difference between the input image of the previous frame and the input image of the next frame, the quality of the decoded image will deteriorate.

Ordinarily, human vision is less sensitive to color differences than to intensity, and thus a 4:2:0 YUV format is used in which UV spatial resolution expressed as Y (intensity), U (red color difference) and V (blue color difference) signals is dropped to ¼. The number of bits per pixel is thus (1+¼+¼)×8=12 bits. Then, with a block of 8 pixels×8 lines as the basic unit, the 4-block basic unit of the Y signal and the 1-block basic units for each of the U, V signals are combined into what is called a macro block. The macro block is the processing unit for interframe prediction. It should be noted that the basic unit composed of the 8 pixels×8 lines described above is the processing unit of the DCT process.

Then, in the first part of the macro block processing time period, after the local decoder 809 inversely quantifies the quantified DCT coefficient and decodes the DCT coefficient and decodes the predicted error used for encoding from the DCT coefficient, it creates a predicted image used for encoding from that predicted error used for encoding and from the predicted image for the previous frame. In the second part of the macro block processing time period, the next frame predicted error is created from the predicted image used for encoding and from the input image, creates the DCT coefficient from that predicted error and quantifies it, after which the quantified predicted error undergoes variable length coding and is encoded.

It should be noted that, although the processing time period in which each of the processes described above is implemented is shown as a first part and a second part of a macro block processing time period, as can be understood by those of ordinary skill in the art, the first part may be considered the second part, with the macro block processing time period starting from the above-described second part and extending to the first part.

In addition, when the encoding processing circuit is implemented as hardware, a variety of efforts have been made with respect to gate dimension reduction. For example, the two-dimensional DCT (Discrete Cosine Transform) of the orthogonal transform employed in JPEG and MPEG is as shown in Equation (1-1). Consider a case in which this calculation is executed on a macro block of 8 pixels×8 lines. In this case, N=8, and when the S for x,y is developed and transformed as Equation (1-3), for a single (u,v) pair it is necessary to multiply 2×8×8=128 times and to add (8×8−1)= 63 times. These operations must be carried out for 64 (u,v) pairs, resulting in 128×64=8192 multiplications and 63×64=4032 additions, and the dimensions of the gate required to implement these operations would be huge.

The two-dimensional DCT calculation shown in Equation (1-1) can be expressed as a combination of one-dimensional DCT calculations like those shown in Equation (3-1) and Equation (3-2), using the one-dimensional DCT expressed in Equation (2-1) and Equation (2-3). In other words, the two-dimensional DCT calculation of Equation (1-1) can be calculated by, first, performing a one-dimensional DCT calculation on the row direction (relating to u) and transposing the DCT data for each line, and then performing a one-dimensional DCT calculation on the column direction (relating to v).

In this case, first, in order to carry out the calculations of Equation (3-1), 8 multiplications and 7 additions are needed in the S of x for one (u,y) pair, and is executed on combinations of u=0, . . . , 7, y=0, . . . , 7, for a total of 64 pairs, and therefore 8×8×8=512 multiplications and 7×8×8=448 additions are necessary.

Next, in order to perform the calculations of Equation (3-2), 8 multiplications and 7 additions are needed in the S of y for one (u,v) pair, and are executed on combinations of u= 0, . . . , 7, v=0, . . . , 7, for a total of 64 pairs, and therefore 8×8×8=512 multiplications and 7×8×8=448 additions are required. Therefore, when the one-dimensional DCT calculations of Equations (3-1) and Equation (3-2) for each row and each column are combined, the calculations of Equation (3-2) can be achieved with 8×8×8×2=1024 multiplications and 7×8×8×2=896 additions, making it possible to reduce multiplications by ⅛ and additions by approximately ¼ compared to a calculation in which Equation (1-1) described above is developed as is.

Two-dimensional DCT and two-dimensional IDCT $$F(u, v) = \frac{2}{N} C(u)C(v) \sum_{x=0}^{N-1} \sum_{y=0}^{N-1} f(x, y)\cos\frac{(2x+1)u\pi}{2N}\cos\frac{(2y+1)v\pi}{2N} \quad (1\text{-}1)$$

$$f(x, y) = \frac{2}{N} \sum_{u=0}^{N-1} \sum_{v=0}^{N-1} C(u)C(v)F(u, v)\cos\frac{(2x+1)u\pi}{2N}\cos\frac{(2y+1)v\pi}{2N} \quad (1\text{-}2)$$

$$F(u, v) = \frac{2}{N} C(u)C(v) \quad (1\text{-}3)$$

$$\left\{ \begin{array}{l} f(0, 0)\cos\frac{(2\times 0+1)u\pi}{2N}\cos\frac{(2\times 0+1)v\pi}{2N} + \ldots \\ + f(N-1, N-1)\cos\frac{\{2(N-1)+1\}u\pi}{2N}\cos\frac{\{2(N-1)+1\}v\pi}{2N} \end{array} \right\}$$

One-dimensional DCT and one-dimensional IDCT $$F(u) = \sqrt{\frac{2}{N}} C(u) \sum_{x=0}^{N-1} f(x)\cos\frac{(2x+1)u\pi}{2N} \quad (2\text{-}1)$$

$$f(x) = \sqrt{\frac{2}{N}} \sum_{u=0}^{N-1} C(u)F(u)\cos\frac{(2x+1)u\pi}{2N} \quad (2\text{-}2)$$

$$C(u) = \begin{cases} \frac{1}{\sqrt{2}} & (u=0) \\ 1 & (u \neq 0) \end{cases} \quad (2\text{-}3)$$

Two-dimensional DCT expressed as two independent one-dimensional DCT $$t(u, y) = \sqrt{\frac{2}{N}} C(u) \sum_{x=0}^{N-1} f(x, y)\cos\frac{(2x+1)u\pi}{2N} \quad (3\text{-}1)$$

$$F(u, v) = \sqrt{\frac{2}{N}} C(v) \sum_{y=0}^{N-1} t(u, y)\cos\frac{(2y+1)v\pi}{2N} \quad (3\text{-}2)$$

In addition, in U.S. Pat. No. 5,841,381, a technology is disclosed that, in an apparatus that carries out Huffman coding/decoding, which is a unidirectional variable length coding (VLC), reduces the memory capacity needed to store the Huffman coding table used when decoding.

However, variable length coding constitutes no more than a small portion of the encoding circuit shown in FIG. 8, and therefore, even if the memory capacity of this portion is reduced, it cannot be said to be the basic countermeasure that reducing the number of gates would be. For example, the circuit dimension of the circuit blocks of the MPEG interframe prediction encoding circuit shown in FIG. 8 are such that the ME and the MC together require some 50-60,000 ASIC gates, the DCT, IDCT, Q and $Q^{-1}$ hardware each require some 15,000 ASIC gates, and the VLC requires some 30,000 ASIC gates, requiring circuit dimension totaling 140-

150,000 ASIC gates, making an increase in gate dimensions and an increase in chip cost unavoidable.

At the same time, in recent years, a dynamically reconfigurable processor capable of rewriting internal structure in an extremely short period of time has been announced. Conventionally, as a device capable of changing the circuit configuration, a FPGA (Field Programmable Gate Array) capable of reconfiguring units of primitive circuits composed of Look-Up Tables and the like into a variety of functions is well known. However, rewriting the circuit configuration of a FPGA usually requires approximately one minute, and it has not been possible to reconfigure dynamically with each clock. By contrast, a dynamically reconfigurable processor can be made into a calculation circuit containing a certain number of multipliers and the like in reconfigurable circuit units and can also make the circuit configuration reconfigurable at each clock (for example, 10 ns) by increasing the speed of the processor.

As that which applies this type of a dynamically reconfigurable processor, there is, for example, the technology disclosed in Japanese Laid-Open Patent Publication No. 2000-102005, which dynamically reconfigures the processor to an optimum calculator configuration depending on the image density value.

Where implementing compression and decompression of still images or moving images using an ordinary processor and software as described above, although inexpensive and flexible, the processing speed is slow. In addition, there is the technical problem that, compared to implementation by hardware, power consumption is great. On the other hand, with methods of implementing by hardware, processing speed is fast and power consumption is less than that when implementing by software, but the required gate size is large, the chip cost high and the mounting area is big.

SUMMARY OF THE INVENTION

The present invention has as its object to solve these technical problems and to achieve high-speed and flexible image processing using a small number of gates.

According to an aspect of the present invention, there is provided an image processing apparatus that carries out predetermined image processing composed of a plurality of steps, the apparatus comprising: dynamically reconfigurable circuits; a reconfiguration information memory unit configured to store a plurality of pieces of circuit information used to configure the dynamically reconfigurable circuits; a reconfiguration timing detection unit configured to detect the timing of a reconfiguration that changes a circuit composed of the dynamically reconfigurable circuits; and a control unit configured to read out circuit information corresponding to the circuit that is to be reconfigured by the dynamically reconfigurable circuits from the reconfiguration information memory unit and reconfigure the dynamically reconfigurable circuits in response to a detection of a reconfiguration, wherein the reconfiguration timing detection unit detects, out of the plurality of steps, the start or the finish of those steps whose processing times are independent.

With such a configuration, the present invention makes it possible to achieve high-speed and flexible image processing using a small number of gates.

Other objects and advantages besides those discussed above shall be apparent to those skilled in the art from the description of preferred embodiments of the invention which follows. In the description, reference is made to the accompanying drawings, which form a part thereof, and which illustrate an example of the various embodiments of the invention. Such examples, however, are not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a flow chart illustrating the operation of the MPEG interframe prediction encoding circuit according to the second embodiment of the present invention;

FIGS. 10A and 10B are block diagrams illustrating the state of the dynamically reconfigurable circuits during operation (during low throughput) of the MPEG interframe prediction encoding circuit according to the third embodiment of the present invention.

DETAILED DESCRIPTION OF THE INVENTION

Preferred embodiments of the present invention will now be described in detail in accordance with the accompanying drawings.

Before proceeding with a description of a specific embodiment, a description will first be given of the basic principle of the invention. The image processing circuit according to the invention is an image processing circuit that achieves processing of such heavy loads as image compression/decompression by executing a series of processes composed of a plurality of steps, using a technology that dynamically reconfigures a circuit that executes two or more different processing steps having different processing time periods for execution. Consequently, implementing the conventional individual and independent processing circuits with a single dynamically reconfigurable circuit operated using time division reduces the circuit dimension while simultaneously achieving high performance (high-speed processing), lower power consumption, low cost (small gate dimensions) and flexibility.

Figure 1:
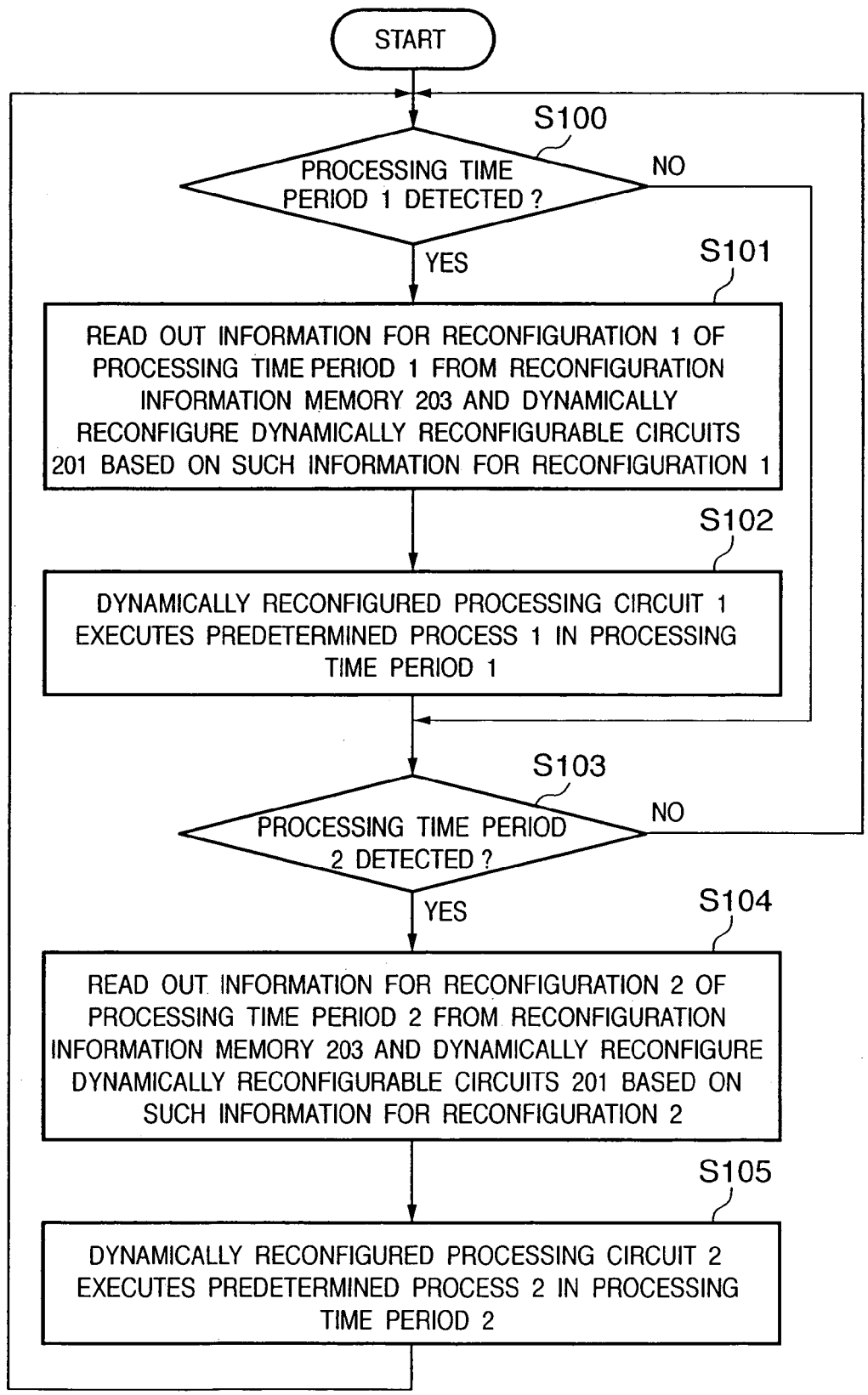
FIG. 1 is a flow chart illustrating the basic operation of an image processing circuit according to the present invention.

FIG. 1 is a flow chart illustrating the basic operation of the image processing apparatus according to the present invention.

FIG. 1 shows as an example the flow of operations when executing each process (process 1, process 2) of two different time periods (time period 1 and time period 2, respectively).

When the processing time period 1 is detected in S100, processing proceeds to S101 and information for reconfiguration 1 for processing time period 1 is read out from a reconfiguration information memory 203 to be described later by operation of a controller 202 to be described later, and based on such information for reconfiguration 1, a processing circuit 1 is dynamically reconfigured into dynamically reconfigurable circuits 201 to be described later.

Then, in S102, in processing time period 1, the dynamically reconfigured processing circuit 1 executes a predetermined process 1 and processing proceeds to S103. Similarly, if the processing time period 1 is not detected in S100, processing then proceeds to step S103. When the processing time period 2 is detected in S103, processing proceeds to step S104 and information for reconfiguration 2 for the processing time period 2 is read out from the reconfiguration information memory 203 by operation of the controller 202, and, based on that information for reconfiguration 2, the processing circuit 2 is dynamically reconfigured into the dynamically reconfigurable circuits 201. Then, in S105, in the processing time period 2, the dynamically reconfigured processing circuit 2 executes a predetermined process 2, and processing returns to S100. If the processing time period 2 is not detected in S103, processing returns to S100.

First Embodiment

Next, as an embodiment that applies the basic operation described in FIG. 1 to a specific process, a description will be given of an arrangement that adapts dynamically reconfigurable means to a MPEG interframe prediction encoding circuit and dynamically reconfigures different processing circuits in the first part and the second part of a macro block processing time period to achieve circuit dimension reduction.

Figure 2:
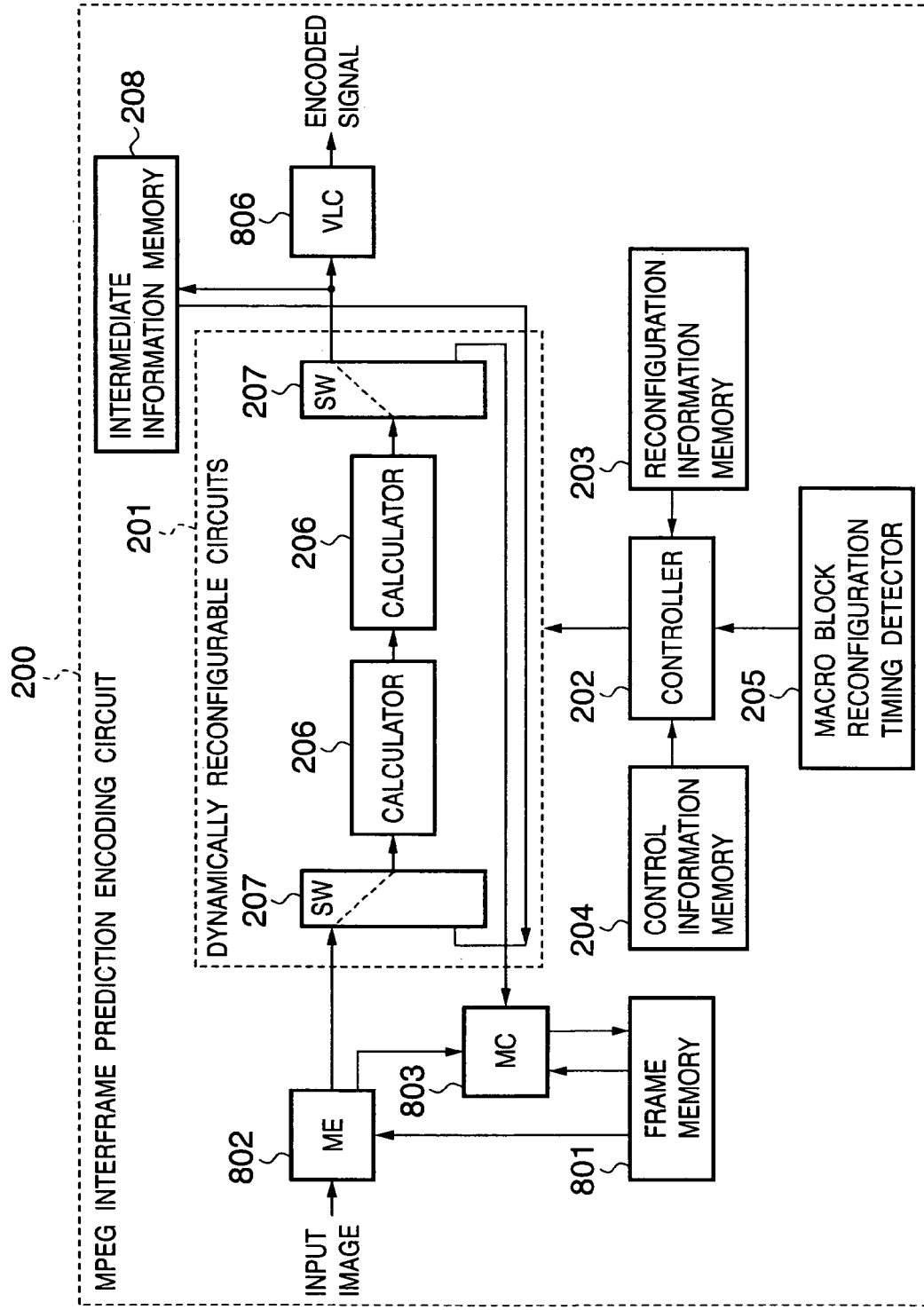
FIG. 2 is a block diagram showing the main components of an MPEG interframe prediction encoding circuit according to a first embodiment of the present invention.
Figure 8:
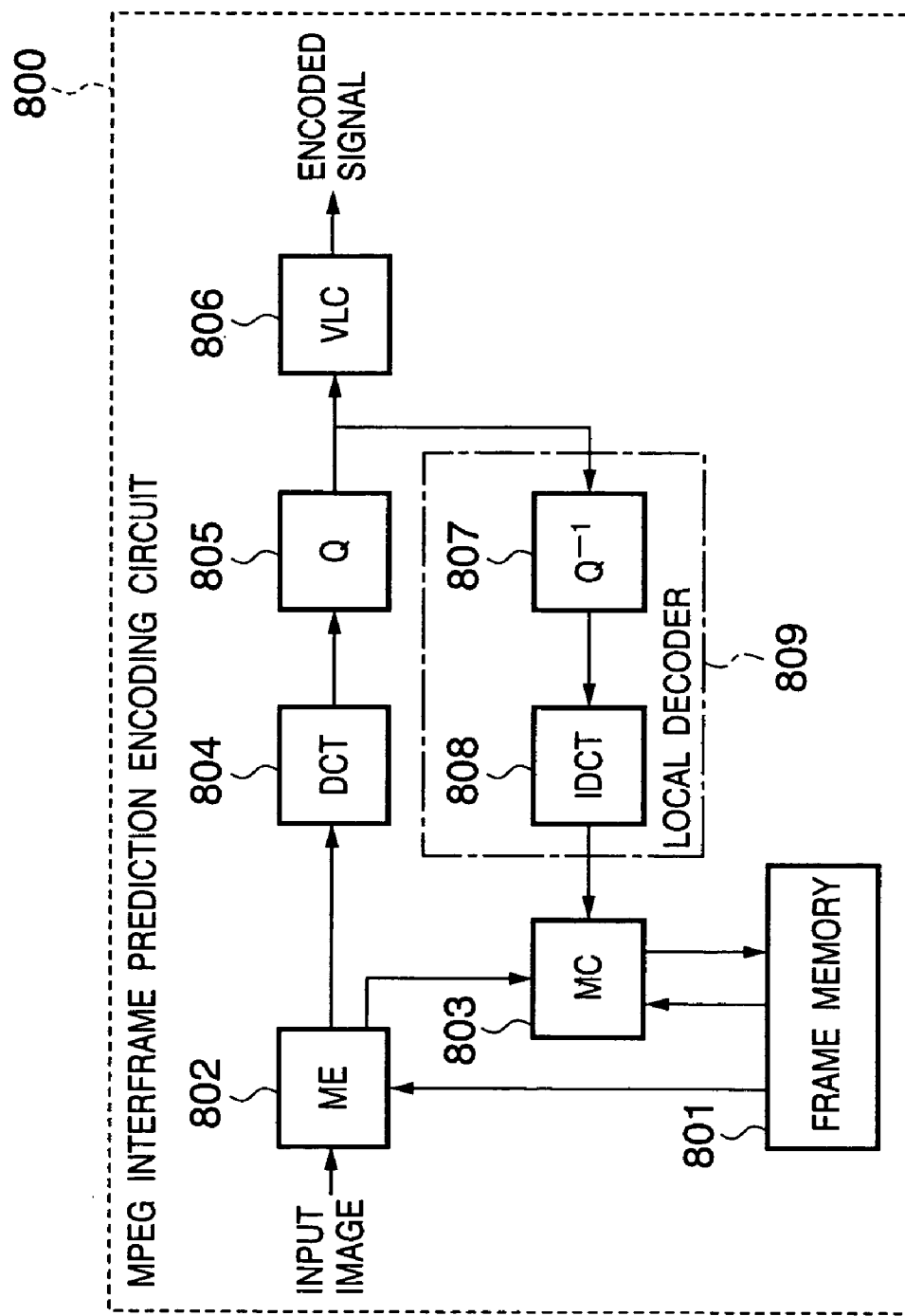
FIG. 8 is a block diagram showing the configuration of a conventional MPEG interframe prediction encoding circuit.

FIG. 2 shows the main components of a MPEG interframe prediction encoding circuit as an image processing circuit according to a first embodiment of the present invention. It should be noted that, in FIG. 2, structures that are the same as those in FIG. 8 are given the same reference numerals and a description thereof is omitted.

In the diagram, reference numeral 201 designates the dynamically reconfigurable circuits, 202 designates the controller for the dynamically reconfigurable circuits, 203 designates the reconfiguration information memory that stores information on the circuits to be dynamically reconfigured, 204 designates a control information memory that stores a control program for the controller, and 205 designates a macro block reconfiguration timing detector. The dynamically reconfigurable circuits 201 are composed of a dynamically reconfigurable processor array or the like. The controller 202 is composed of an ordinary CPU or the like. The reconfiguration information memory 203 and the control information memory 204 are composed of ordinary nonvolatile memories such as flash memories. In addition, reference numeral 208 designates an intermediate information memory for exchanging information with the dynamically reconfigurable circuits.

In this embodiment, the macro block reconfiguration timing detector 205 detects the start of the first part (corresponding to processing time period 1 in FIG. 1) and the second part (corresponding to processing time period 2 in FIG. 1) of the macro block processing time period. The dynamically reconfigurable circuits 201 are composed of reconfigurable calculators 206 and a pair of switches (hereinafter called SW) 207 that switch connections. Reference numeral 801 designates the frame memory, 802 designates the ME, 803 designates the MC, and 806 designates the VLC. These are the same as in FIG. 8 and a description thereof is omitted.

Figure 3A:
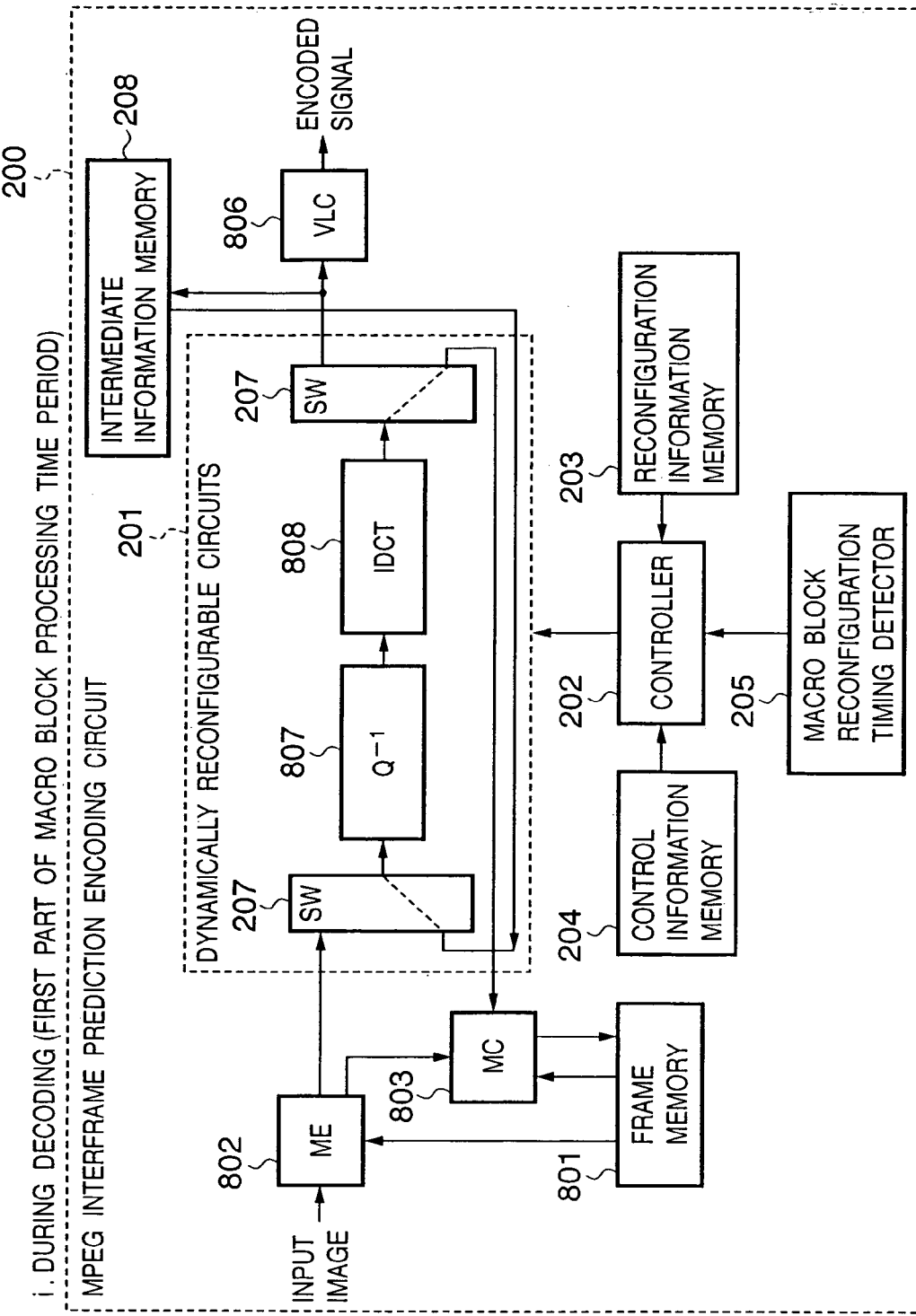
FIGS. 3A and 3B are block diagrams illustrating a state of dynamically reconfigurable circuits during operation of the MPEG interframe prediction encoding circuit according to the first embodiment of the present invention.
Figure 3B:
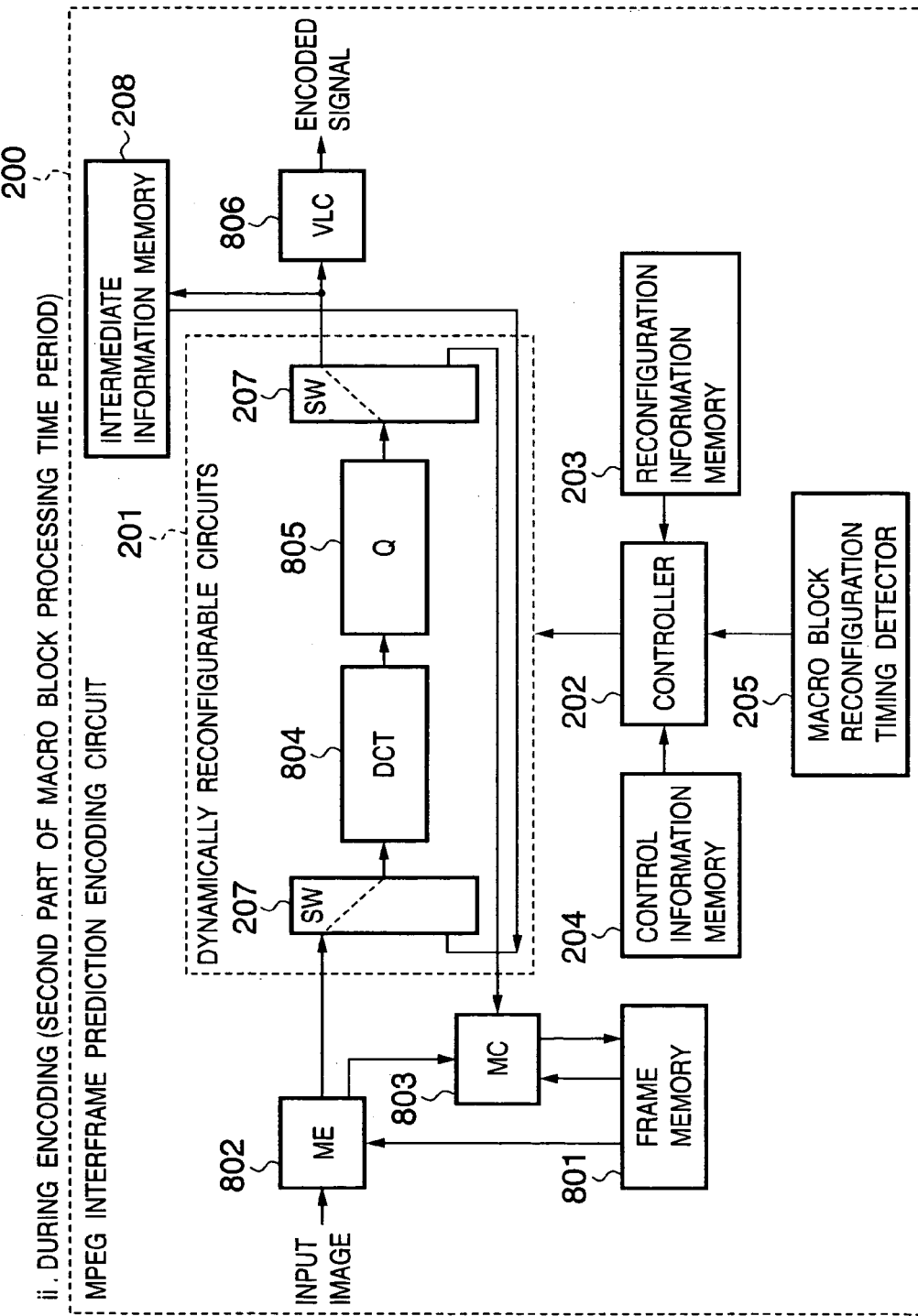

FIG. 3A shows the configuration of the first part of the macro block processing time period of the prediction encoding circuit, and FIG. 3B shows the configuration of the second part. In this embodiment, a local decoder is dynamically reconfigured to the dynamically reconfigurable circuits 201 shown in FIG. 2 in the first part of the macro block processing time period and an encoding processor is dynamically reconfigured to the dynamically reconfigurable circuits 201 in the second part of the macro block processing time period, respectively.

Figure 4:
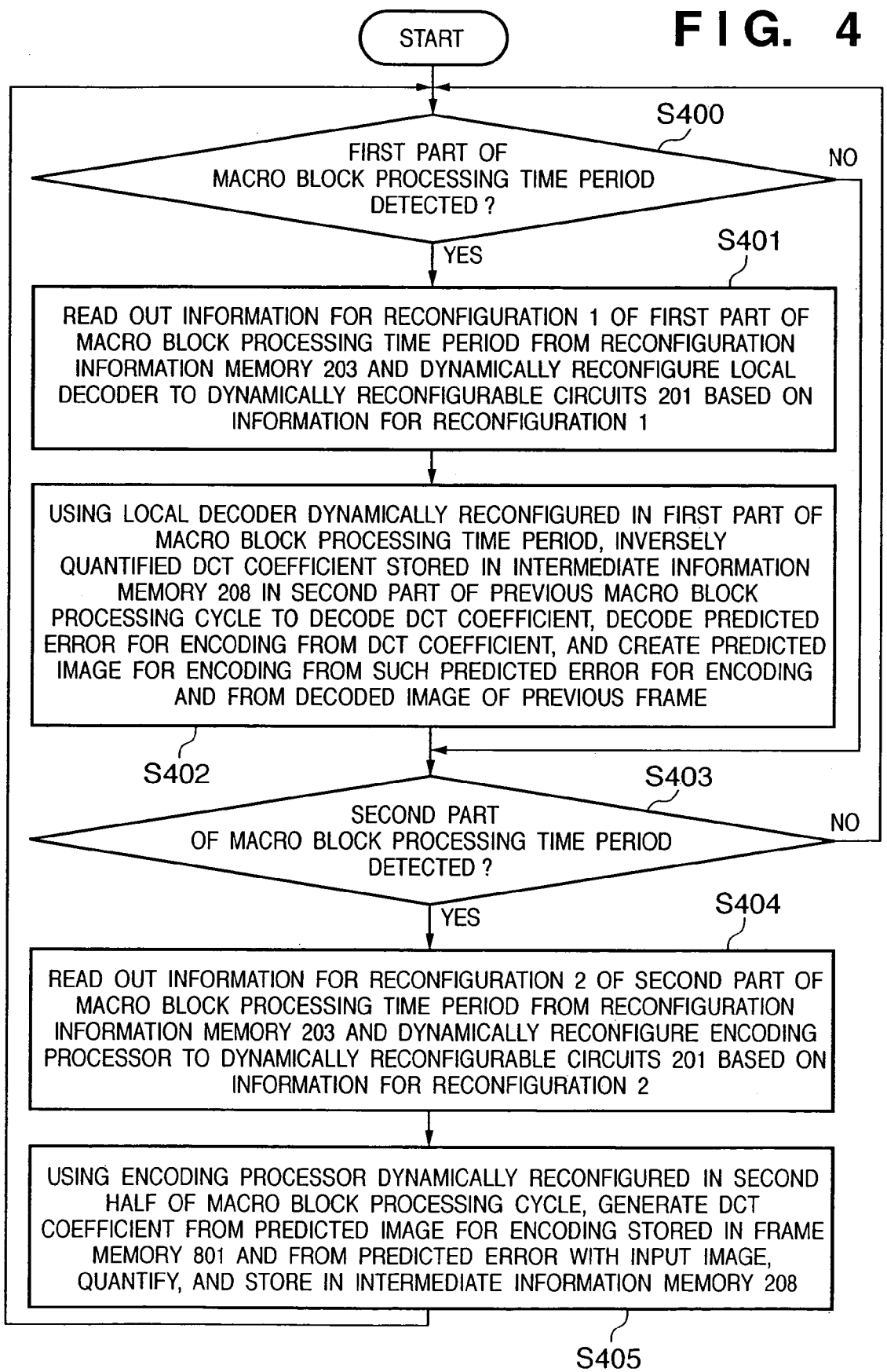
FIG. 4 is a flow chart illustrating the operation of the MPEG interframe prediction encoding circuit according to the first embodiment of the present invention.

FIG. 4 shows the flow of operations of the encoding circuit having the configuration shown in FIG. 3A and FIG. 3B.

A description will now be given of the operation of the MPEG interframe prediction encoding circuit of this embodiment according to FIG. 3A, FIG. 3B and FIG. 4.

In S400, when the start of the first part of the macro block processing time period is detected by the macro block reconfiguration timing detector 205, that information is reported to the controller 202 by an interrupt or the like. In S401, the controller 202, based on the program stored in the control information memory 204, reads from the reconfiguration information memory 203 the information for reconfiguration of the local decoder composed of the $Q^{-1}$ 807 and the IDCT 808, and based on that information for reconfiguration dynamically reconfigures the local decoder using the dynamically reconfigurable circuits 201 calculators 206 and SW 207.

Then, in S402, as explained using FIG. 8, the local decoder composed of the $Q^{-1}$ 807 and the IDCT 808 inversely quantifies the quantified DCT coefficient stored in the intermediate information memory 208 in the second part of the previous macro block cycle and decodes it, after which it decodes the predicted error for encoding from the DCT coefficient and produces a predicted image for encoding from that predicted error for encoding and from the decoded image of the previous frame. In addition, although not shown in FIG. 4, in the first part of the macro block processing time period the motion vector is detected by the ME 802 and motion compensation is carried out by the MC 803 based on the motion vector for that macro block. The motion-compensated encoded predicted image is then stored in the frame memory 801.

Next, in S403, when the start of the second part of the macro block processing time period is detected by the macro block reconfiguration timing detector 205, that information is reported to the controller 202 by interruption or the like. In S404, the controller 202, based on the program stored in the control information memory 204, reads from the reconfiguration information memory 203 the information for reconfiguration of the encoding processor composed of the DCT 804 and the Q 805, and based on that information for reconfiguration dynamically reconfigures the encoding processor using the dynamically reconfigurable circuits 201 calculators 206 and SW 207. Then, in S405, as explained using FIG. 8, the encoding processor composed of the DCT 804 and Q 805 generates a DCT coefficient from the predicted error for the encoded predicted image stored in the frame memory 801 and the input image, quantifies the DCT coefficient, and stores the quantified DCT coefficient in the intermediate information memory 208. In addition, although not shown in FIG. 4, in the second part of the macro block cycle the DCT coefficient and the motion vector for that macro block are identified by the VLC 806 and variable-length encoded depending on the frequency of appearance.

Thus, as described above, in this embodiment, in the first part and the second part of the macro block processing time period of the MPEG interframe prediction encoding circuit, the local decoder and the encoding processor are dynamically reconfigured, enabling a reduction in circuit dimension of approximately 30,000 ASIC compared to the conventional configuration that provides both a local decoder and an encoding processor requiring approximately 30,000 ASIC each. It should be noted that the processing load on the controller 202 for the control of the dynamically reconfigurable circuits 201 is on the order of several MIPS and the capacity required of the control information memory 204 and the reconfiguration information memory 203 is on the order of several Kbytes, and can easily be mounted in the controller as well as the control information memory and data memory for the image processing apparatus itself that contains the MPEG interframe prediction encoding circuit 200, and thus do not cause an increase in circuit dimension.

In addition, if the image size is VGA (640 pixels×480 lines) and the frame rate is 30 frames/second, then 1 macro block must be encoded within 16×16/(640×480×30)=27.8 μs at a minimum. When figuring in such overhead as simultaneously executing decoding, processing must be carried out within half that time or less. The high-speed reconfigurable processors announced in recent years operate at a maximum speed of 100 MHz and are reconfigurable in 1 clock (10 ns). This type of high-speed processor is fully adequate to carry out the dynamic reconfiguration described above in the first part and the second part of the macro block processing time period.

It should be noted that the circuit configuration shown in FIG. 2 is merely one example, and as can be understood by those of ordinary skill in the art, the configuration and so forth of the controller and the reconfiguration information memory may be implemented using a different architecture.

In addition, although in this embodiment both the local decoder composed of the $Q^{-1}$ 807 and the IDCT 808 and the encoding processor composed of the DCT 804 and the Q 805 processing circuits are dynamically reconfigured in different time periods, the circuits that are to be dynamically reconfigured are not limited by the present invention, and as can be understood by those of ordinary skill in the art, if the encoding/decoding processing steps are executed in different time periods, then the processing circuits corresponding to those steps may be dynamically reconfigured. For example, in a MPEG interframe prediction encoding circuit, from among a motion detection step, a motion compensation step, an orthogonal transform (DCT) step, a quantification (Q) step, an inverse quantification ($Q^{-1}$) step, an inverse orthogonal transform (IDCT) step and a variable length coding (VLC) step, processing circuits corresponding to two or more different processes executed at different times may be dynamically reconfigured.

In addition, although in this embodiment the dynamic reconfiguration switching time period is the first part and the second part of the macro block processing time period, as can be understood by those of ordinary skill in the art, the macro block time period may be defined as from the second part of the embodiment to the first part, with the switching done in the first part and the second part.

In addition, although in this embodiment the dynamic reconfiguration switching time period is the first part and the second part of the macro block processing time period, as can be understood by those of ordinary skill in the art, the dynamic reconfiguration switching time period, too, is not limited by the present embodiment, and of the encoding/decoding steps, for two or more different encoding steps executed in different time periods, for each processing time period, the corresponding processing circuit may be dynamically reconfigured.

In addition, although in this embodiment both the local decoder composed of the $Q^{-1}$ 807 and the IDCT 808 and the encoding processor composed of the DCT 804 and the Q 805 processing circuits are dynamically reconfigured in different time periods, the part in common of the DCT 804 and the IDCT 808 may be provided in advance as a DCT/IDCT common circuit, and the remaining circuits as between that DCT/IDCT common circuit and the IDCT 808, as well as the remaining circuits as between that DCT/IDCT common circuit and the DCT 804, may be individually dynamically reconfigured.

Thus, as described above, with the present embodiment, high-speed and flexible image processing using a small number of gates can be achieved.

Second Embodiment

Figure 5:
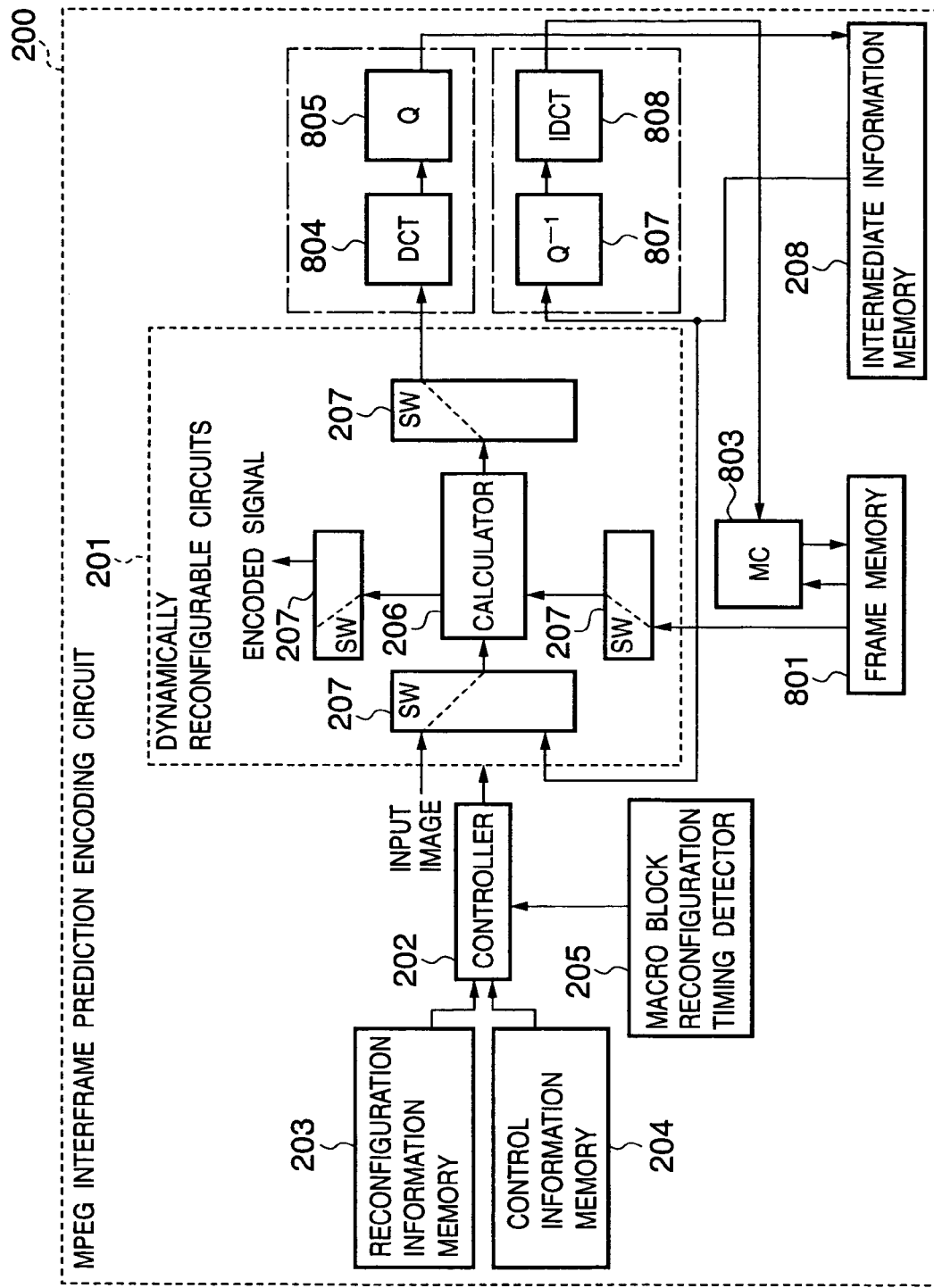
FIG. 5 is a block diagram showing the main components of a MPEG interframe prediction encoding circuit according to a second embodiment of the present invention.

FIG. 5 shows the configuration of a second embodiment of the present invention. It should be noted that, in FIG. 5, the same reference numerals are used for structures that are the same as those in FIG. 2 or in FIG. 8.

In the diagram, reference numeral 201 designates the dynamically reconfigurable circuits, 202 designates the dynamically reconfigurable circuits controller, 203 designates the reconfiguration information memory that stores information on the circuits to be dynamically reconfigured, 204 designates the control information memory that stores the control program for the controller, and 205 designates the macro block reconfiguration timing detector. In this embodiment as well, the macro block reconfiguration timing detector 205 detects the start of the first part and the second part of the macro block processing time period. The dynamically reconfigurable circuits 201 are composed of reconfigurable calculators 206 and a pair of switches (hereinafter called SW) 207 that switch connections. Reference numeral 801 designates the frame memory, 803 designates the MC, 804 designates the DCT, 805 designates the Q, 807 designates the $Q^{-1}$ and 808 designates the IDCT.

Figure 6A:
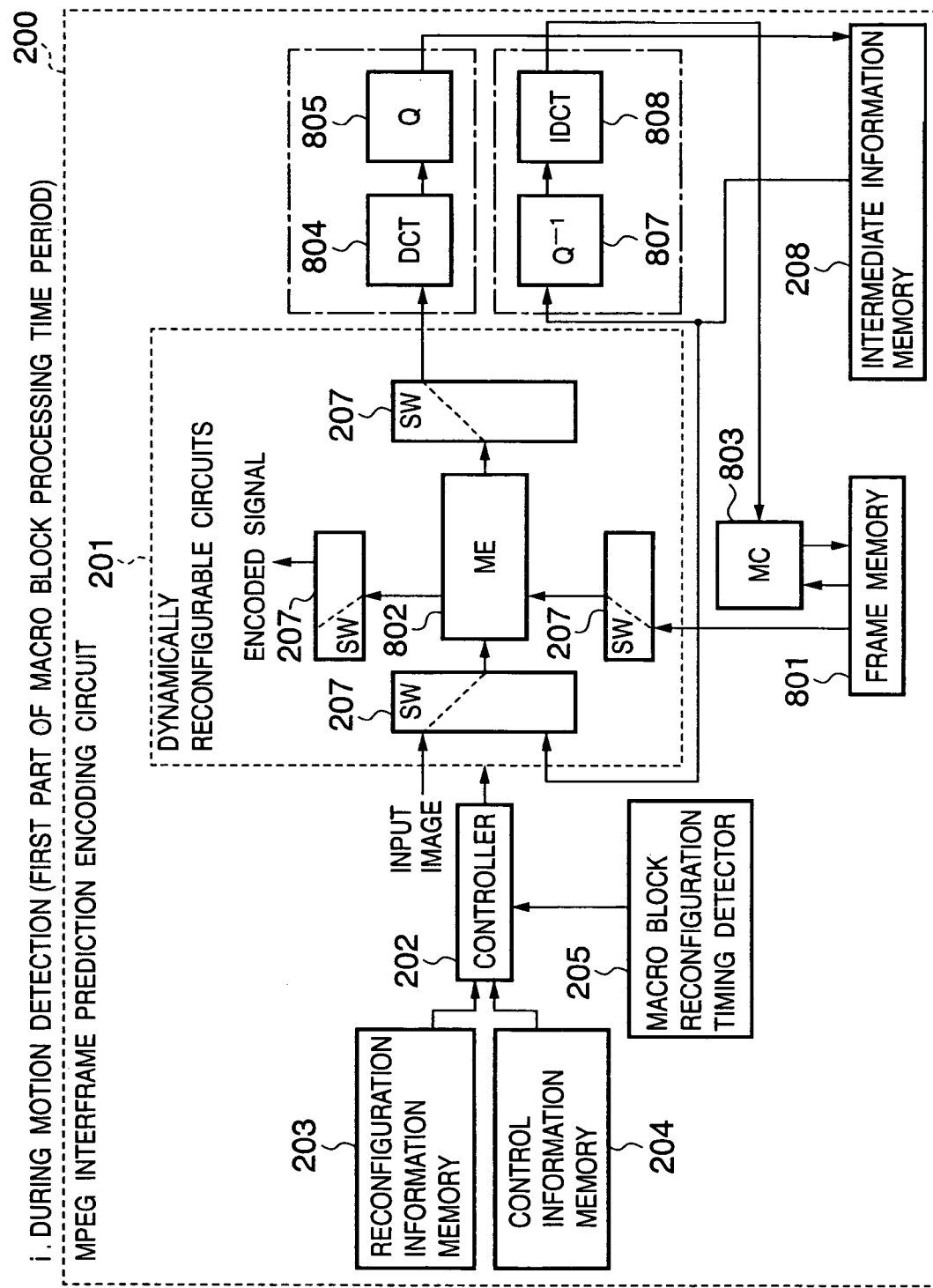
FIGS. 6A and 6B are block diagrams illustrating the state of the dynamically reconfigurable circuits during operation of the MPEG interframe prediction encoding circuit according to the second embodiment of the present invention.
Figure 6B:
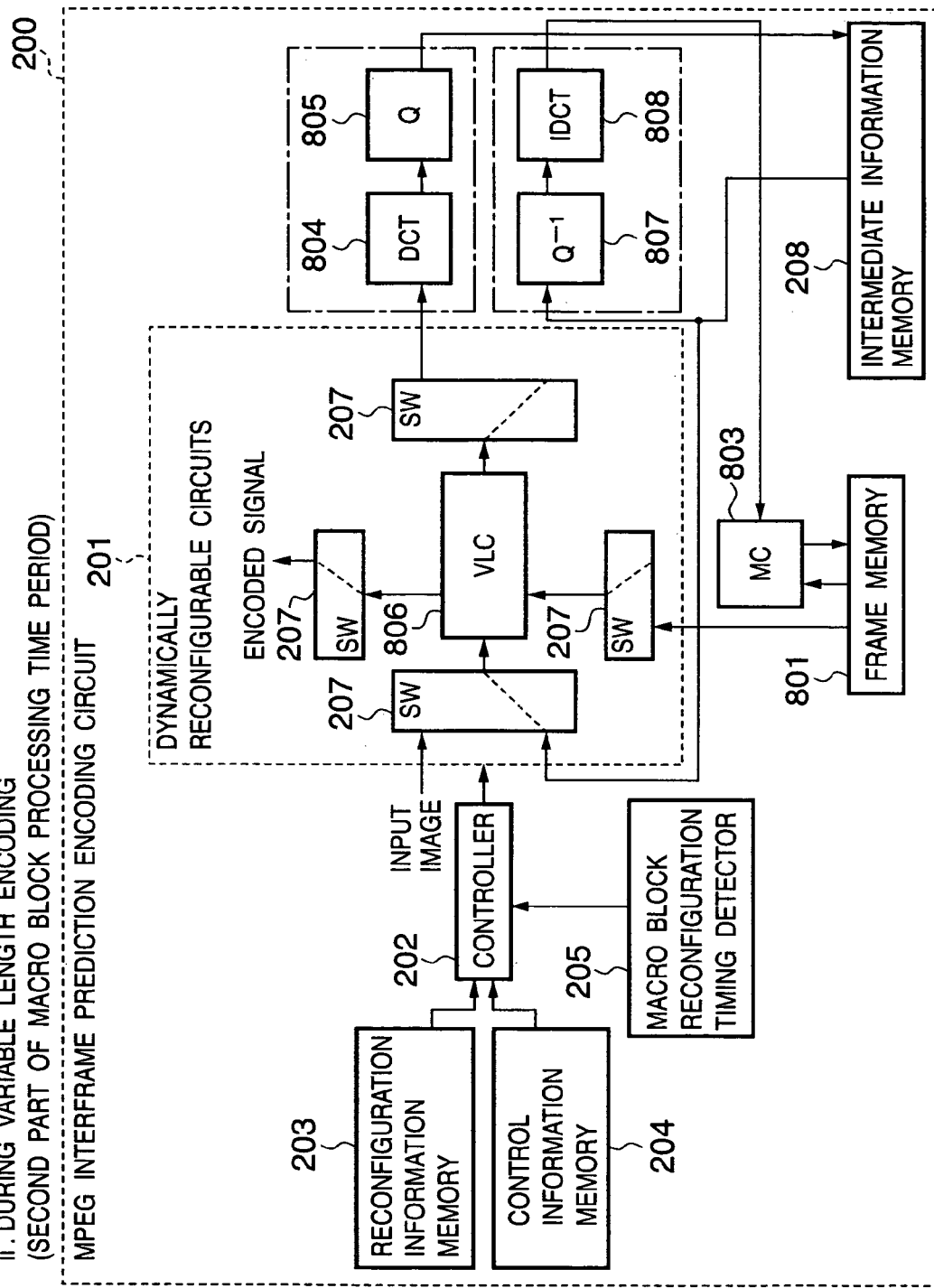

In this embodiment, as shown in FIGS. 6A and 6B, the ME 802 is dynamically reconfigured in the first part of the macro block processing time period and the VLC 806 is dynamically reconfigured in the second part of the macro block processing time period, and on this point the MPEG interframe prediction encoding circuit of the present embodiment differs from the MPEG interframe prediction encoding circuit of the first embodiment.

FIG. 7 shows the flow of operations of the encoding circuit according to the present embodiment.

A description will now be given of the operation of the MPEG interframe prediction encoding circuit of this embodiment according to FIGS. 6A, 6B and 7.

In S700, when the start of the first part of the macro block processing time period is detected by the macro block reconfiguration timing detector 205, that information is reported to the controller 202 by an interrupt or the like. In S701, the controller, based on the program stored in the control information memory 204, reads out the information for reconfiguration of the ME 802 from the reconfiguration information memory 203, and, based on that information for reconfiguration, dynamically reconfigures the ME 802 using the dynamically reconfigurable circuits 201 calculators 206 and SW 207.

Then, in S702, the ME 802 searches for that macro block and for the closest approximating macro block in the reference frame and identifies the motion vector. In addition, although not shown in FIG. 7, in the first part of the macro block cycle, the DCT coefficient is decoded by inverse quantification by the local decoder (composed of the $Q^{-1}$ 807 and the IDCT 808) of the quantified DCT coefficient stored in the intermediate information memory 208 in the second part of the previous macro block processing cycle, and from the DCT coefficient the predicted error for encoding is decoded. Then, a predicted image for encoding is created from that predicted error for encoding and from the previous frame decoded image, the MC 803 carries out motion compensation based on that motion vector for that macro block, and the motion compensated coded predicted image is stored in the frame memory 801.

Then, in S703, when the macro block reconfiguration timing detector 205 detects the start of the second part of the macro block processing time period, that information is reported to the controller 202 by an interrupt or the like. In S704, the controller 202, based on the program stored in the control information memory 204, reads out the information for reconfiguration of the VLC 806 from the reconfiguration information memory 203, and, based on that information for reconfiguration, dynamically reconfigures the VLC 806 using the dynamically reconfigurable circuits 201 calculators 206 and SW 207. Then, in S705, the VLC 806 variable-length encodes the DCT coefficient and the motion vector for that macro block depending on frequency of appearance and outputs the encoded DCT coefficient as an encoded signal. In addition, although not shown in FIG. 7, in the second part of the macro block cycle, the DCT coefficient is generated by the encoding processor from the predicted error of the predicted image for encoding stored in the frame memory 801 and the input image, quantified, and stored in the intermediate information memory 208.

Thus, as described above, with this embodiment as well, in which both the ME 802 and the VLC 806 processing circuits are dynamically reconfigured at different time periods, the same effect can be achieved as with the first embodiment.

In addition, the first embodiment and the second embodiment may be combined, and the ME and the local decoder may be dynamically reconfigured in the first part of the macro block processing time period and the encoding processor and VLC may be dynamically reconfigured in the second part.

In addition, although in this embodiment the dynamic reconfiguration switching time period is the first part and the second part of the macro block processing time period, as can be understood by those of ordinary skill in the art, the macro block time period may be defined as from the second part of the embodiment to the first part, with the switching done in the first part and the second part.

In addition, although in the present embodiment as well, as with the first embodiment, the dynamic reconfiguration switching process time period is the first part and the second part of the macro block processing time period, the dynamic reconfiguration switching process time period also is not limited by the present invention, and as can be understood by those of ordinary skill in the art, of the encoding/decoding processing steps, for two or more different encoding processing steps executed at different times, in each processing time period, the corresponding processing circuit may be dynamically reconfigured.

Third Embodiment

Figure 9:
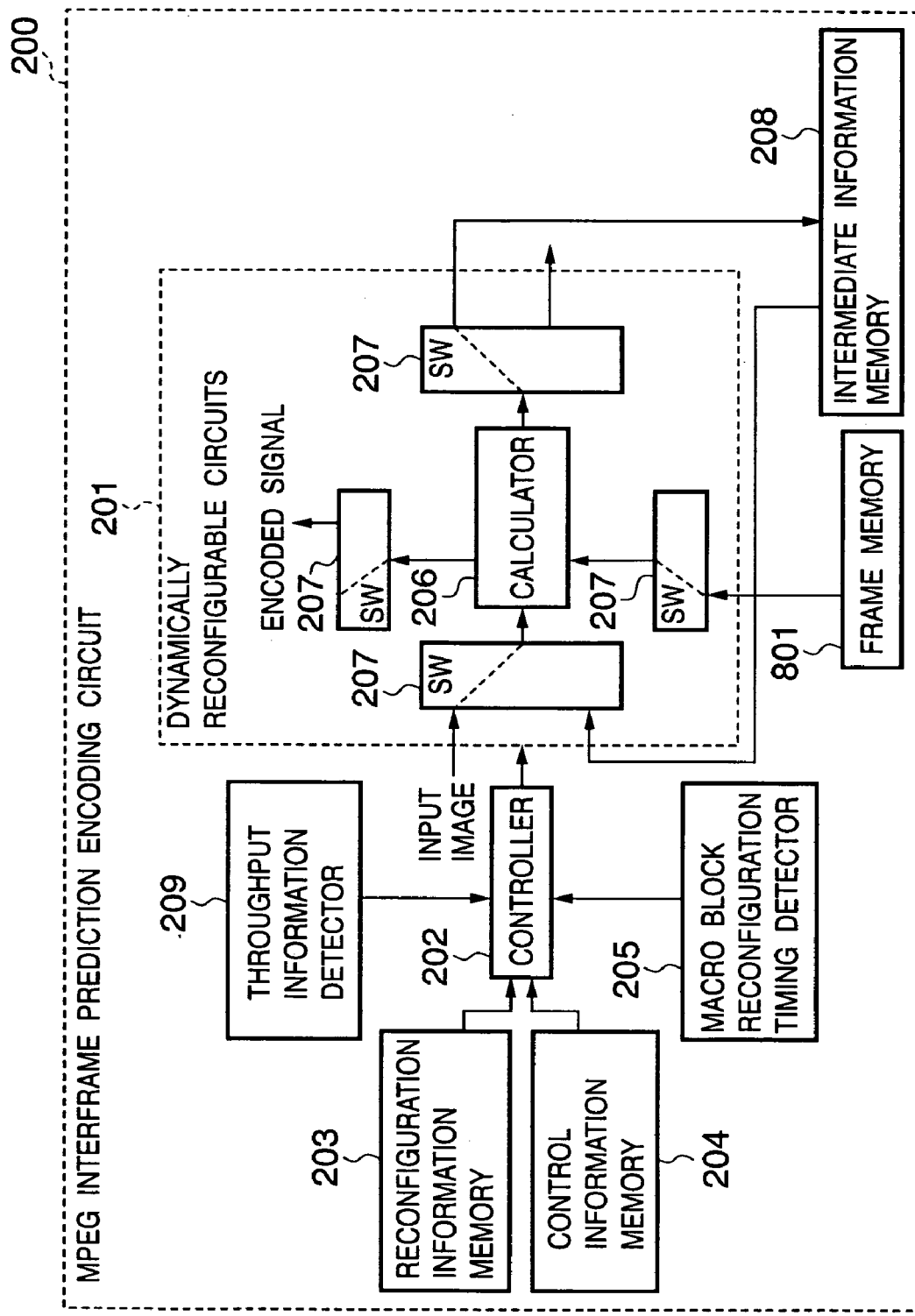
FIG. 9 is a block diagram showing the main components of a MPEG interframe prediction encoding circuit according to a third embodiment of the present invention.

FIG. 9 shows the configuration of a third embodiment of the invention. It should be noted that, in FIG. 9, the same reference numerals are used for structures that are the same as those in FIG. 5 described in the second embodiment.

In this embodiment, a throughput information detector 209 is installed and the functions and dimension on the circuits generated by dynamic reconfiguration are determined according to the required throughput. In other words, if the circuit is one that implements a single function, then the throughput increases as the circuit dimensions increase, and therefore when high throughput is needed the circuit dimensions are increased. However, when the circuit dimensions are increased in order to achieve a given function, the resources available for configuring circuits in order to achieve other functions decreases. As a result, the number of reconfigurations is increased.

Specifically, low throughput is acceptable where the required process encodes an image the size of QVGA (320 pixels×240 lines) at 15 fps, and the desired data processing speed also is approximately 27 Mbps. Therefore, the circuit operating speed conditions are comparatively loose, and it is possible to select circuits of comparatively small circuit dimensions and to dynamically reconfigure the circuits corresponding to a plurality of processing steps in one dynamic reconfiguration. For example, it is possible to dynamically reconfigure and execute circuits that carry out motion detection (ME) and motion compensation (MC) of the MPEG2 encoding process in the first part of the macro block processing time period, and to dynamically reconfigure the circuits that carry out the processes of the DCT, Q, IDCT, $Q^{-1}$ and the VLC in the second part.

By contrast, when the required process encodes an image the size of full color (24 bit/pixel) VGA (640 pixels×480 lines) at 60 fps, high throughput is necessary. In this case, the desired data processing speed also increases substantially, to approximately 442 Mbps. Accordingly, the circuit operating speed conditions are also comparatively strict, and comparatively large circuit dimensions are selected and dynamically reconfigured with priority given to operating speed.

As a result, if the number of types of circuits that are implemented by one dynamic reconfiguration decreases, the number of necessary dynamic reconfigurations also increases. For example, in terms of the MPEG2 encoding process steps, at the low throughput described above, two reconfigurations are sufficient. However, at high throughput, four dynamic reconfigurations are required, for example (1) ME and MC, (2) DCT and IDCT, (3) Q and $Q^{-1}$, and (4) VLC.

In addition, given the required throughput, although the macro block cycle may be relatively long with low throughput, with high throughput there are times when it is necessary to make the macro block cycle relatively short as well.

Figure 10A:
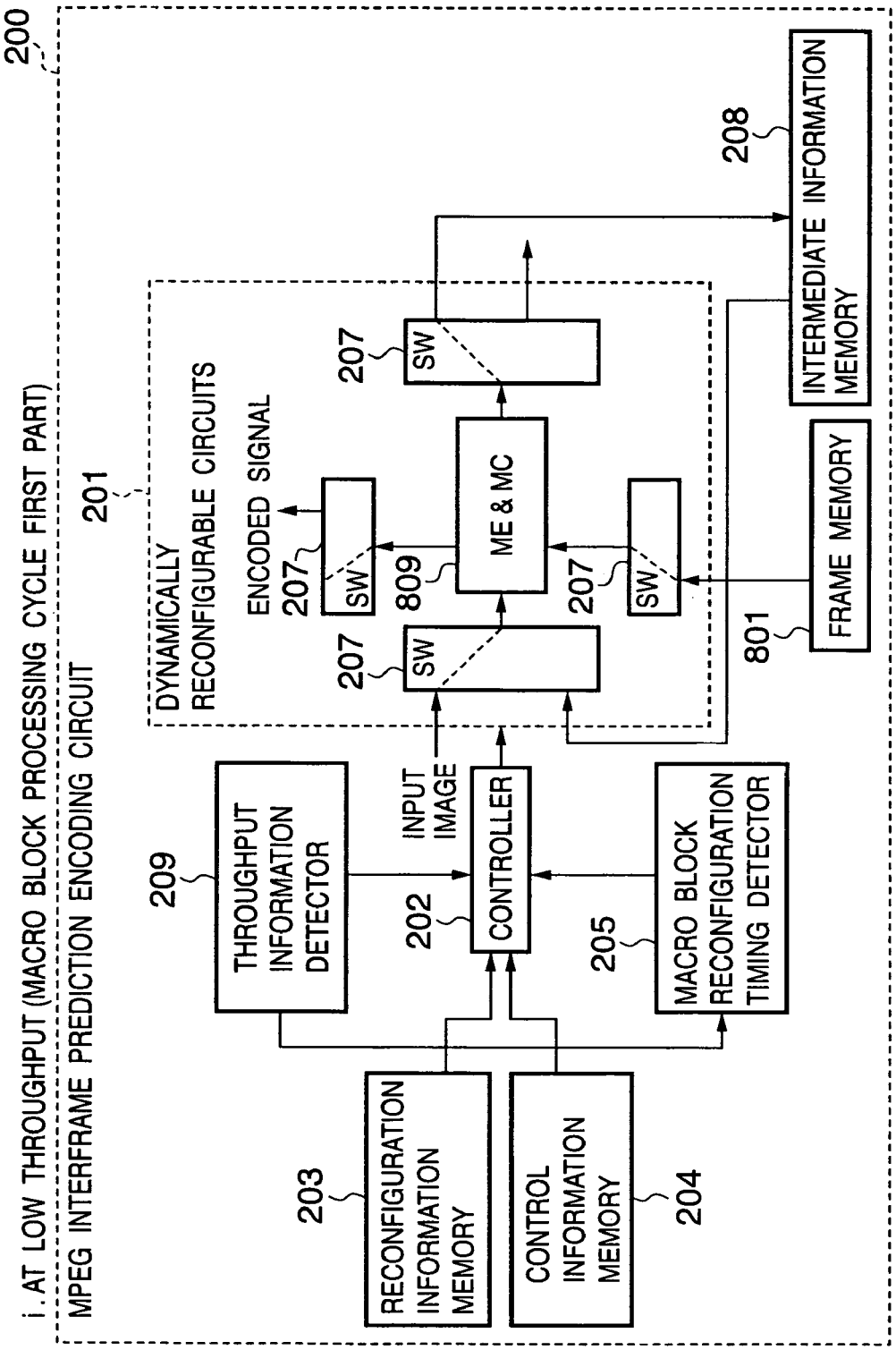

FIGS. 10A and 10B show a configuration at low throughput, in a MPEG interframe prediction encoding circuit of a third embodiment of the invention. In addition, FIGS. 11A-11D show a configuration at high throughput, in the MPEG interframe prediction encoding circuit of the third embodiment.

In these diagrams, the same reference numerals are used for structures that are the same as those in FIG. 9.

In the diagrams, reference numeral 201 designates the dynamically reconfigurable circuits, 202 designates the controller for the dynamically reconfigurable circuits, 203 designates the reconfiguration information memory that stores information on the circuits to be dynamically reconfigured, 204 designates the control information memory that stores a control program for the controller, and 205 designates the macro block reconfiguration timing detector. In this embodiment, in the reconfiguration information memory 203, depending on the required throughput, information for the dynamic reconfiguration of the circuits corresponding to the steps is stored in time period portions within the macro block processing time period. In other words, for circuits implementing the same function, a plurality of different types of circuit dimensions (=processing speeds) are stored.

In addition, reference numeral 209 designates a throughput detector that detects the required throughput information input through a user interface or the like, not shown, and outputs the throughput information to the controller 202. The controller then selects the information for reconfiguration corresponding to the reconfiguration information memory 204 depending on the required throughput detected by the throughput information detector.

The macro block reconfiguration timing detector 205, depending on the required throughput (processing performance), detects the timing of the reconfiguration. In this embodiment, at low throughput, the macro block reconfiguration timing detector 205 detects the start of the first part and the second part into which the macro block processing time period is divided. At high throughput, the macro block reconfiguration timing detector 205 detects the start of the first, second, third and fourth time periods into with the macro block processing time period is divided.

In addition, depending on the throughput, the macro block cycle itself is of different lengths. The dynamically reconfigurable circuits 201 are composed of a reconfigurable calculator 206 and switches (hereinafter called SW) that switch connections. Reference numeral 801 designates the frame memory.

Reference numerals 807 and 809-812 designate circuits implemented by reconfiguration of the calculator 206. Reference numeral 809 designates the ME & MC, 810 designates the DCT, Q, $Q^{-1}$, IDCT and VLC, 811 designates the DCT and IDCT, 812 designates the Q and $Q^{-1}$, and 807 designates the VLC.

As shown in FIGS. 10A and 10B, in this embodiment, at low throughput, the ME and MC are dynamically reconfigured in the first part of the macro block processing cycle and the relevant processes executed, and the DCT, Q, $Q^{-1}$, IDCT and VLC are dynamically reconfigured and executed in the second part.

Figure 11A:
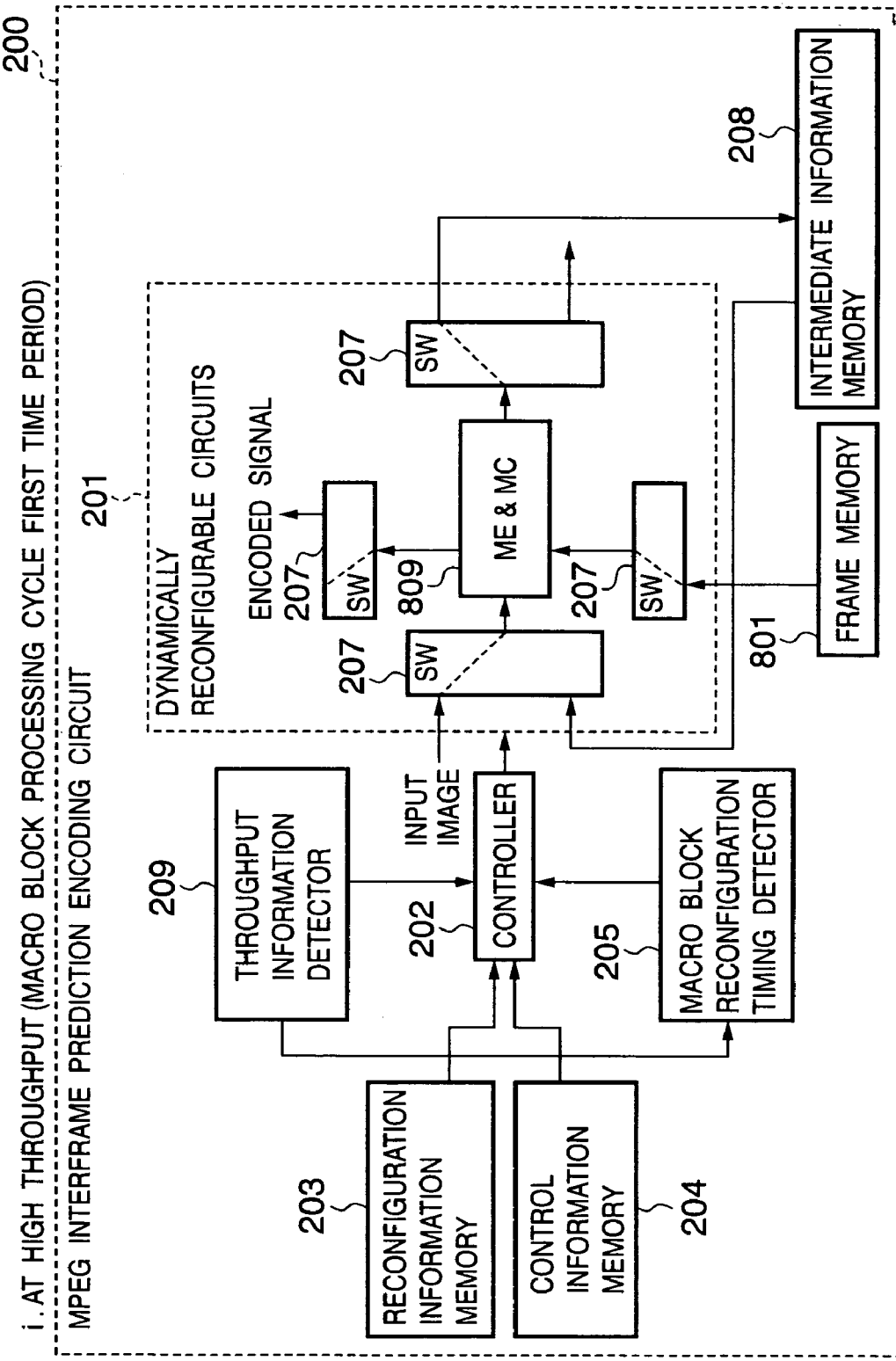
FIGS. 11A, 11B, 11C and 11D are block diagrams illustrating the state of the dynamically reconfigurable circuits 210 during operation (during high throughput) of the MPEG interframe prediction encoding circuit according to the third embodiment of the present invention.
Figure 11B:
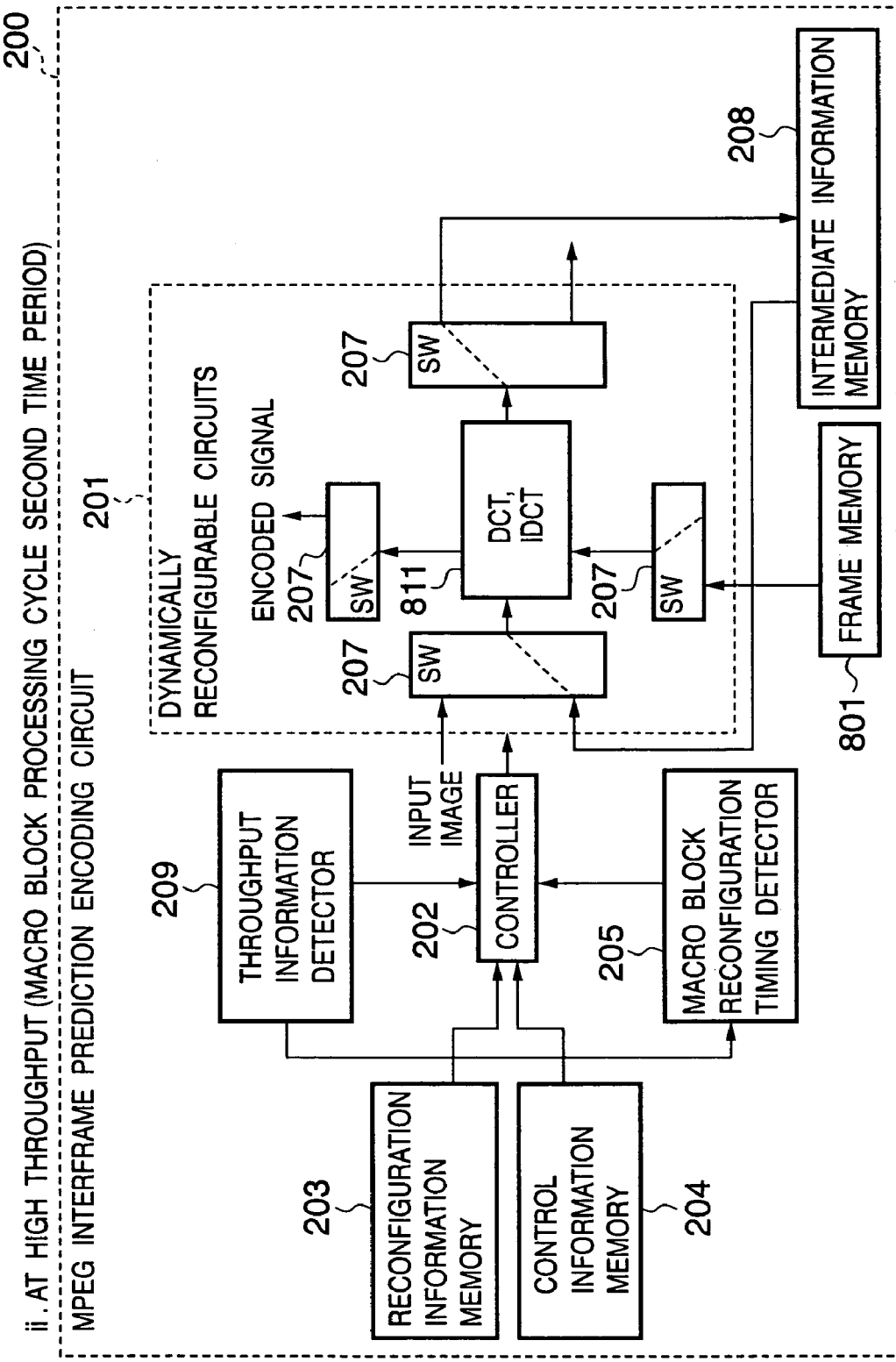
Figure 11C:
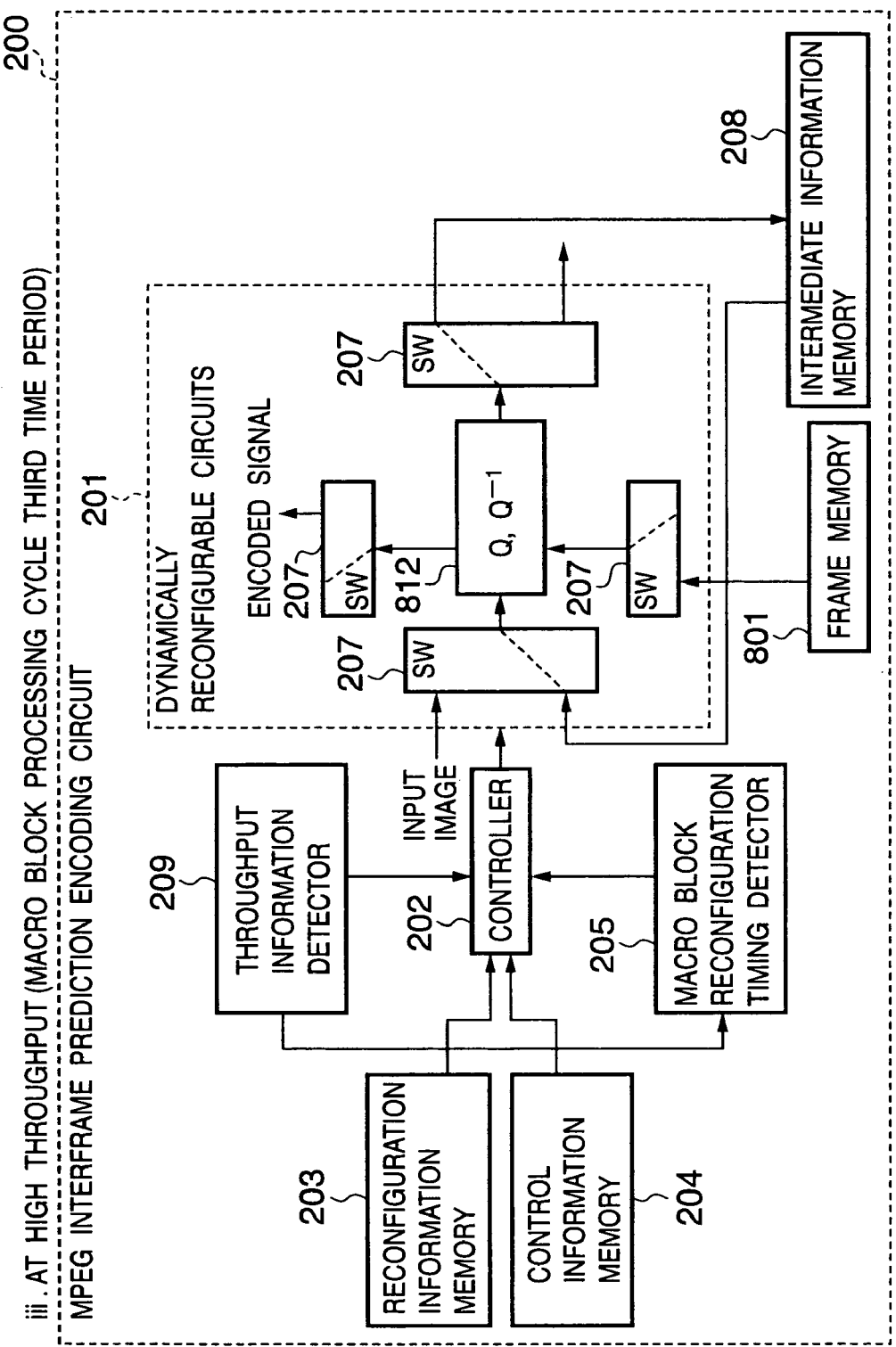
Figure 11D:
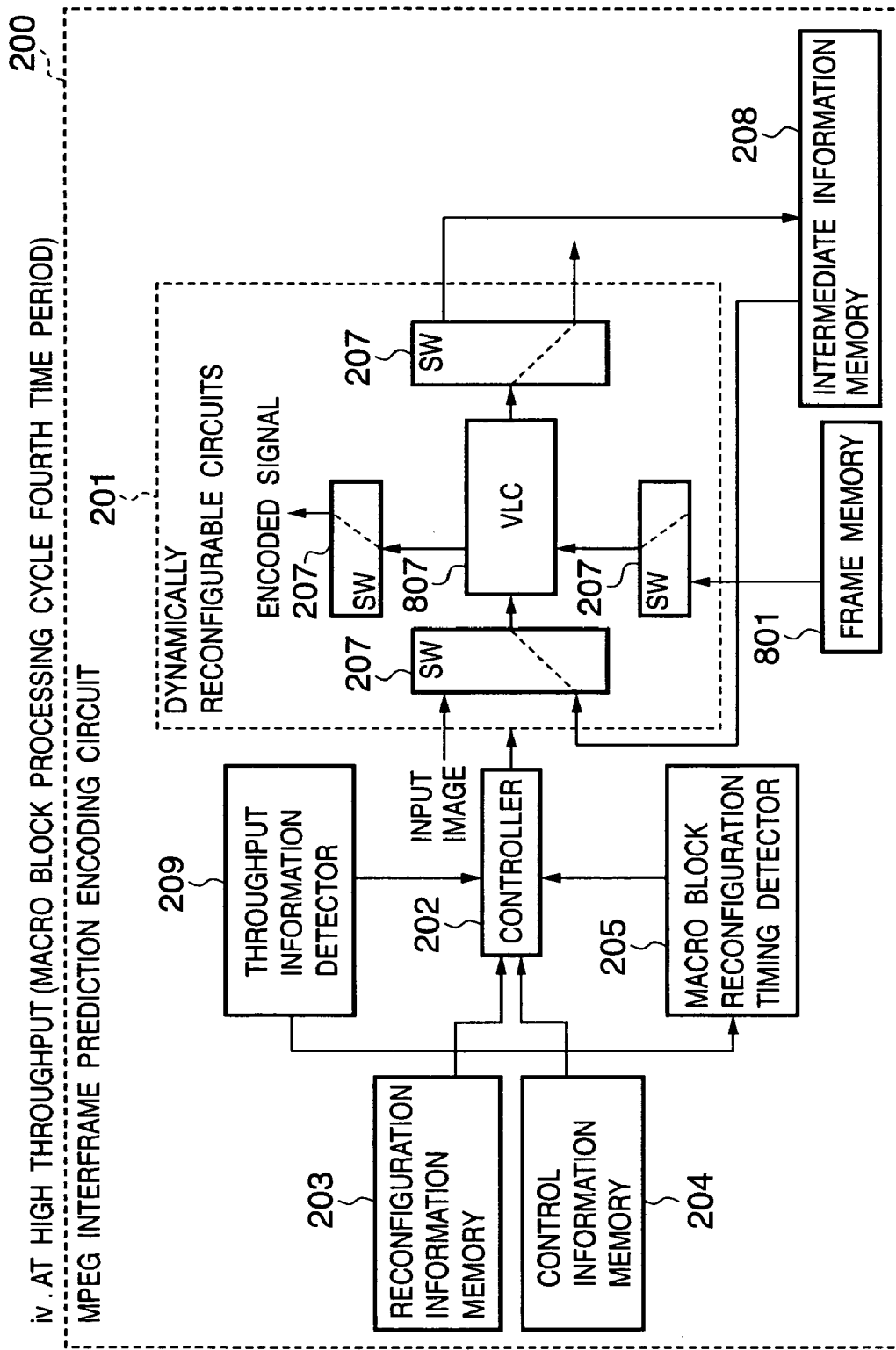

By contrast, at high throughput, the ME and MC are dynamically reconfigured and the relevant processes executed in the first time period of the macro block processing time period, (FIG. 11A), and the DCT and the IDCT are dynamically reconfigured and the relevant processes executed in the second period (FIG. 11B). Then, Q and $Q^{-1}$ are dynamically reconfigured in the third period (FIG. 11C) and the VLC is dynamically reconfigured in the fourth period (FIG. 11D).

These adjustments are implemented using the same procedures as those described with reference to the flow chart shown in FIG. 7 for the second embodiment. In other words, in the case of low throughput, the only difference is that the types of circuits to be reconfigured in the first part and the second part of the processing time period are different. In addition, in the case of high throughput, the only differences are that the number of detections of switching of the processing time period is increased from two to four and the types of circuits to be reconfigured after detection are different.

Thus, as described above, by reducing the number of dynamic reconfigurations within a predetermined time period when the throughput required by the encoding process is low, the present embodiment enables the processing load attendant upon dynamic reconfiguration to be reduced and the load to be divided-among other processes. For example, the dynamically reconfigurable circuits controller can implement other graphic processing and the like while causing the dynamically reconfigurable circuits to execute encoding.

In addition, when the throughput required by the encoding process is low, by reducing the number of dynamic reconfigurations within a predetermined cycle, the present embodiment enables the number of times the reconfiguration data is loaded or the number of times the intermediate memory circuits are written to or read from to be reduced, thus reducing power consumption.

In addition, because the present embodiment can respond flexibly when the throughput required by the encoding process is high, processing of a variety of different input signals can be accomplished with a single configuration. Therefore, the present embodiment, as with the first embodiment and the second embodiment, makes it possible to achieve high-speed and flexible image processing with a smaller number of gates compared to a configuration in which the circuits for the steps are in parallel, regardless of the throughput.

Other Embodiments

It should be noted that, in the foregoing embodiments, to facilitate an understanding of the invention, the configuration content of the dynamically reconfigurable circuits is switched in a first part and a second part of the macro block processing. However, "first part" and "second part" are not limited to meaning the division of the macro block processing time period into two equal parts. Thus, for example, when the macro block processing is composed of decoding and encoding, at times the time periods required by these two processes are not equal. In such cases, the timing at which reconfiguration is carried out is not the mid-point in time of the macro block processing time period, but, for the sake of convenience, an expression of that type is used herein.

Although in the foregoing embodiments the processing circuits to be reconfigured within a predetermined processing time period are determined in advance, alternatively, the processing circuits to be reconfigured within the predetermined processing time period may be determined based on such commonly measurable indexes as the processing load, the throughput, or the compression rate, or on a predetermined index such as a degree of difficulty of encoding (which can be defined as a combination of a measurable plurality of indexes, for example) that is decided in advance.

For example, with respect to the degree of difficulty of encoding, with regard to temporal direction compression, the degree of difficulty of encoding may be defined as high when motion is extensive and when error information prior to implementation of ME is at or above a certain level. With regard to spatial direction compression, the degree of difficult of encoding may be defined as high when there are many high-frequency components and when the DCT coefficient is large.

In addition, the degree of difficulty of the processing load and the compression rate, as with the degree of difficult of encoding, may also be defined as high when the processing load is high and the compression rate is low.

As an example of dynamically reconfigured control based on such indexes, where the temporal direction degree of difficulty of encoding is low (in other words, when the processing load also is small), for example, dynamic reconfiguration of the ME may be dispensed with. When the spatial direction degree of difficulty of encoding is high (in other words, when the processing load also is large), the circuits may be reconfigured so that a plurality of those circuits that implement a process of compressing the run-length effective data as VLC pre-processing can operate in parallel, and when the degree of difficulty of encoding is low (that is, when the processing load also is large), only one of the above-described circuits reconfigured.

In addition, similarly, the dynamic reconfiguration of processing circuits corresponding to which steps, in which time periods, may be determined based on the processing results of predetermined processing steps, and dynamic reconfiguration may be adjusted accordingly. For example, if the search conducted to detect the motion vector of the relevant macro block has entailed a large calculation processing load, then in order to conduct the search to detect the motion vector of the next block an additional calculation circuit may be dynamically reconfigured and the processing load dispersed using a plurality of calculation circuits.

It should be noted that although the foregoing embodiments have been described using its application to a MPEG interframe prediction encoding circuit as an example, and although the encoding and decoding of images is a field to which the present invention can be applied with ease, as can be understood by those of ordinary skill in the art, the present invention is basically a process comprised of processing steps executed at different time periods and can therefore be applied to any process that requires high-speed processing by hardware.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Applications No. 2004-199410 filed on Jul. 6, 2004, No. 2005-167354 filed on Jun. 7, 2005 and No. 2005-179649 filed on Jun. 20, 2005, which are hereby incorporated by reference herein.

What is claimed is:

1. An image processing apparatus that carries out encoding of a macro block comprised of a plurality of steps, the apparatus comprising:
dynamically reconfigurable circuits;
a reconfiguration information memory unit configured to store a plurality of pieces of circuit information used to configure the dynamically reconfigurable circuits;
a reconfiguration timing detection unit configured to detect the timing of a reconfiguration that changes a circuit comprised of the dynamically reconfigurable circuits; and
a control unit configured to read out circuit information corresponding to the circuit that is to be reconfigured by the dynamically reconfigurable circuits from the reconfiguration information memory unit and reconfigure the dynamically reconfigurable circuits in response to a detection of a reconfiguration,
wherein the reconfiguration timing detection unit detects, out of the plurality of steps, the start or the finish of the steps having independent processing times, and at least the start of the encoding of a macro block, and
wherein the control unit reduces the number of dynamic reconfigurations within a predetermined processing time cycle when a throughput required by the encoding process is low and increases the types of circuits to be dynamically reconfigured with each reconfiguration, and increases the number of dynamic reconfigurations within the predetermined processing time cycle when the throughput is high and decreases the types of circuits to be dynamically reconfigured with each reconfiguration.

2. An image processing apparatus that carries out encoding of a macro block comprised of a plurality of steps, the apparatus comprising:
dynamically reconfigurable circuits;
a reconfiguration information memory unit configured to store a plurality of pieces of circuit information used to configure the dynamically reconfigurable circuits;
a reconfiguration timing detection unit configured to detect the timing of a reconfiguration that changes a circuit comprised of the dynamically reconfigurable circuits; and
a control unit configured to read out circuit information corresponding to the circuit that is to be reconfigured by the dynamically reconfigurable circuits from the reconfiguration information memory unit and reconfigure the dynamically reconfigurable circuits in response to a detection of a reconfiguration,
wherein the reconfiguration timing detection unit detects, out of the plurality of steps, the start or the finish of the steps having independent processing times, and at least the start of the encoding of a macro block, and
wherein:
when the throughput required by the encoding process is low, the control unit dynamically reconfigures twice within a predetermined processing cycle, the first time dynamically reconfiguring a motion prediction circuit and a motion compensation circuit, the second time dynamically reconfiguring a discrete cosine transform circuit, a quantifying circuit and a variable length coding circuit; and
when the throughput is high, the control unit dynamically reconfigures four times within a predetermined processing cycle, the first time dynamically reconfiguring the motion prediction circuit and a motion compensation circuit, the second time dynamically reconfiguring the discrete cosine transform circuit and an inverse discrete cosine transform circuit, the third time dynamically reconfiguring the quantifying circuit and an inverse quantifying circuit, and the fourth time dynamically reconfiguring the variable length coding circuit, respectively.

3. An image processing apparatus that carries out predetermined image processing comprised of a plurality of steps, the apparatus comprising:
dynamically reconfigurable circuits;
a reconfiguration information memory unit configured to store a plurality of pieces of circuit information used to configure the dynamically reconfigurable circuits;
a reconfiguration timing detection unit configured to detect the timing of a reconfiguration that changes a circuit comprised of the dynamically reconfigurable circuits; and
a control unit configured to read out circuit information corresponding to the circuit that is to be reconfigured by the dynamically reconfigurable circuits from the reconfiguration information memory unit and reconfigure the dynamically reconfigurable circuits in response to a detection of a reconfiguration, wherein the reconfiguration timing detection unit detects, out of the plurality of steps, the start or the finish of the steps having independent processing times, wherein the control unit determines the circuit to be configured by the dynamically reconfigurable circuits based on a predetermined index, and wherein:

the index is either encoding or decoding throughput; and the control unit favors smallness of circuit dimension over operating speed in determining the circuit to be reconfigured when the throughput is low and favors rapidity of operating speed over circuit dimension when the throughput is high.

* * * * *